(12) United States Patent
Ishida

(10) Patent No.: US 12,230,976 B2
(45) Date of Patent: Feb. 18, 2025

(54) MAGNETIC RESONANCE WIRELESS POWER TRANSFER DEVICE

(71) Applicants: KAKE EDUCATIONAL INSTITUTION, Okayama (JP); ADTEX INC., Gunma (JP)

(72) Inventor: Hiroki Ishida, Okayama (JP)

(73) Assignees: KAKE EDUCATIONAL INSTITUTION, Okayama (JP); ADTEX INC., Gunma (JP)

( * ) Notice: Subject to any disclaimer, the term of this patent is extended or adjusted under 35 U.S.C. 154(b) by 0 days.

(21) Appl. No.: 18/263,581

(22) PCT Filed: Feb. 4, 2022

(86) PCT No.: PCT/JP2022/004443
§ 371 (c)(1),
(2) Date: Jul. 31, 2023

(87) PCT Pub. No.: WO2022/168945
PCT Pub. Date: Aug. 11, 2022

(65) Prior Publication Data
US 2024/0120775 A1 Apr. 11, 2024

(30) Foreign Application Priority Data
Feb. 8, 2021 (JP) ................... 2021-018613

(51) Int. Cl.
*H02J 50/12* (2016.01)
(52) U.S. Cl.
CPC .................. *H02J 50/12* (2016.02)
(58) Field of Classification Search
CPC ...................................... H02J 50/12
See application file for complete search history.

(56) References Cited

U.S. PATENT DOCUMENTS

| | | | |
|---|---|---|---|
| 2015/0333801 A1* | 11/2015 | Hosotani | H04B 5/22 307/104 |
| 2020/0012008 A1* | 1/2020 | Chen | G01L 9/14 |

(Continued)

OTHER PUBLICATIONS

Sid Assawaworrarit, Xiaofang Yu & Shanhui Fan, "Robust wireless power transfer using a nonlinear parity-time-symmetric circuit", Nature, vol. 546, Jun. 15, 2017, 387-390, https://web.stanford.edu/group/fan/publication/Assawarorrarit_Nature_546_387_2017.pdf.

(Continued)

*Primary Examiner* — Jared Fureman
*Assistant Examiner* — Duc M Pham
(74) *Attorney, Agent, or Firm* — Pearne & Gordon LLP

(57) ABSTRACT

[PROBLEM]
To provide a magnetic resonance wireless power transfer device which allows constant transmission power and high transmission efficiency to be maintained over a long transmission distance even when the distance (transmission distance) between a transmitter coil and a receiver coil changes.
[SOLUTION]
In a magnetic resonance wireless power transfer device wherein a negative resistance circuit 20, a transmitter resonant circuit 10 having a transmitter coil 11, and a receiver resonant circuit 30 having a receiver coil 11 are configured so that the parity-time symmetry is preserved, out of two resonant loops (Loop I and Loop II) in which a resonant current is circulatable when the transmitter resonant circuit 10 and the receiver resonant circuit 30 are regarded as a double resonant circuit coupled with a mutual inductance, Q value of the Loop II is set to be higher than Q value of the Loop I, so that oscillation occurs in the Loop II in which a leakage inductance component of the coil and a capacitance component of a capacitor resonate.

8 Claims, 13 Drawing Sheets

(56) References Cited

U.S. PATENT DOCUMENTS

2021/0249914 A1* 8/2021 Li .................... H02J 50/90
2023/0314181 A1* 10/2023 Tseng ................ H02J 50/20
324/207.15

OTHER PUBLICATIONS

Jiali Zhou, Bo Zhang, Wenxun Xiao, Dongyuan Qiu & Yanfeng Chen, IEEE Transactions on Industrial Electronics, "Nonlinear Parity-Time-Symmetric Model for for Constant Efficiency Wireless Power Transfer: Application to a Drone-in-Flight Wireless Charging Platform", May 2019, vol. 66, No. 5, 4097-4107, https://ieeexplore.ieee.org/stamp/stamp.jsp?tp=&arnumber=8437240.

Hiroki Ishida, Hiroto Furukawa & Tomoaki Kyoden, "Frequency tracking of wireless power transfer system with negative resistance oscillator", Annual Meeting Record, I.E.E., Japan (CD-ROM), vol. 2020, ROMBUNNO.4-095, Mar. 1, 2020.

Hiroki Ishida, Hiroto Furukawa & Tomoaki Kyoden, "Scheme for providing parity-time symmetry for low-frequency wireless power transfer below 20 KHz", Electrical Engineering, ISSN 0948-7921, Jul. 11, 2020, http://link.springer.com/article/10.1007/s00202-020-01041-3.

International Search report dated Mar. 29, 2022 issued in PCT/JP2022/004443.

* cited by examiner

[FIG. 1]
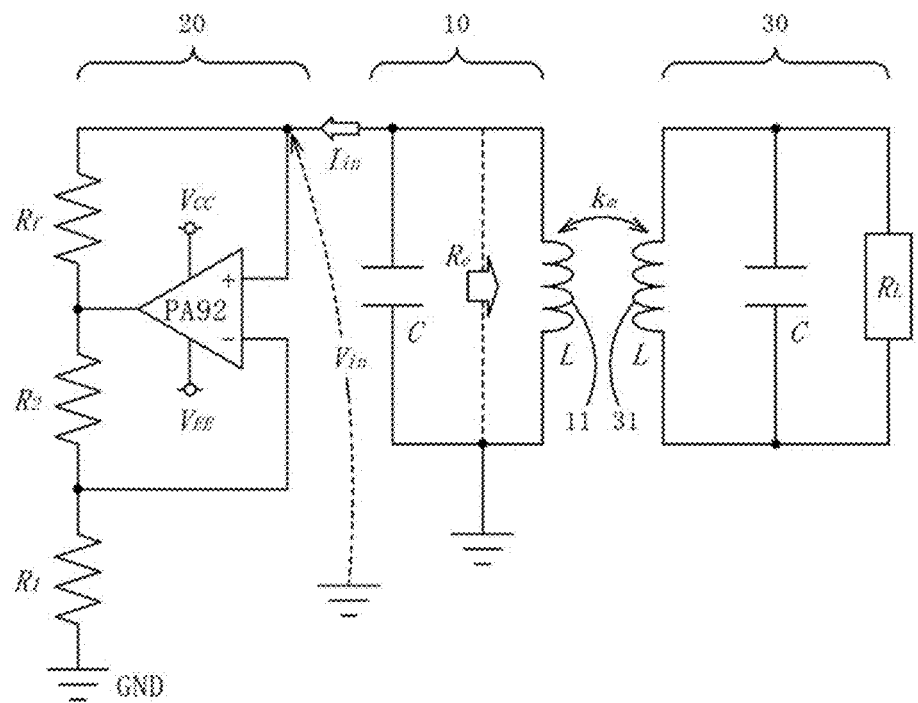
[FIG. 2]
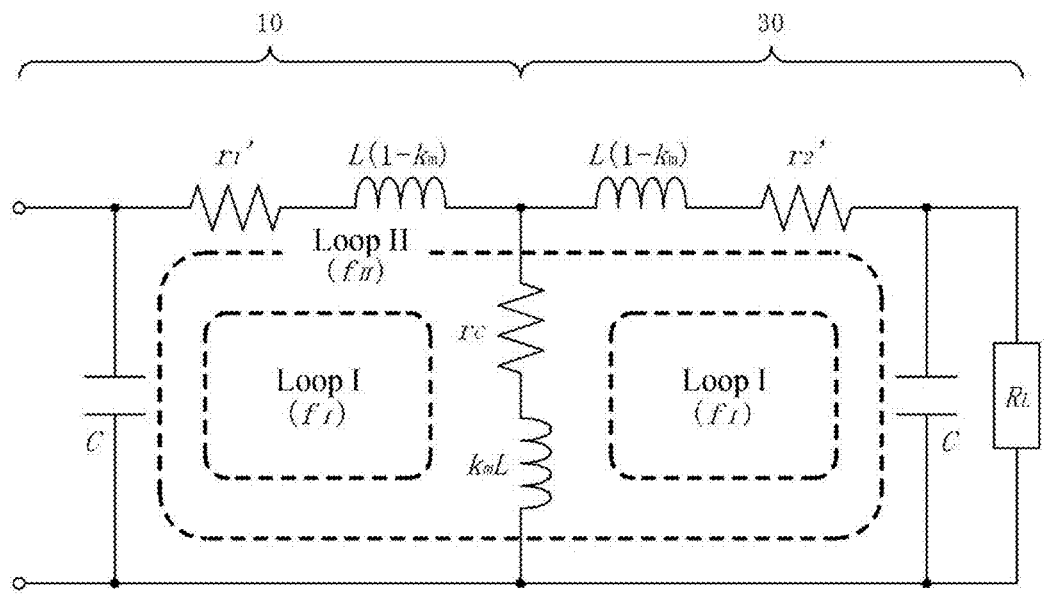

[FIG. 3]
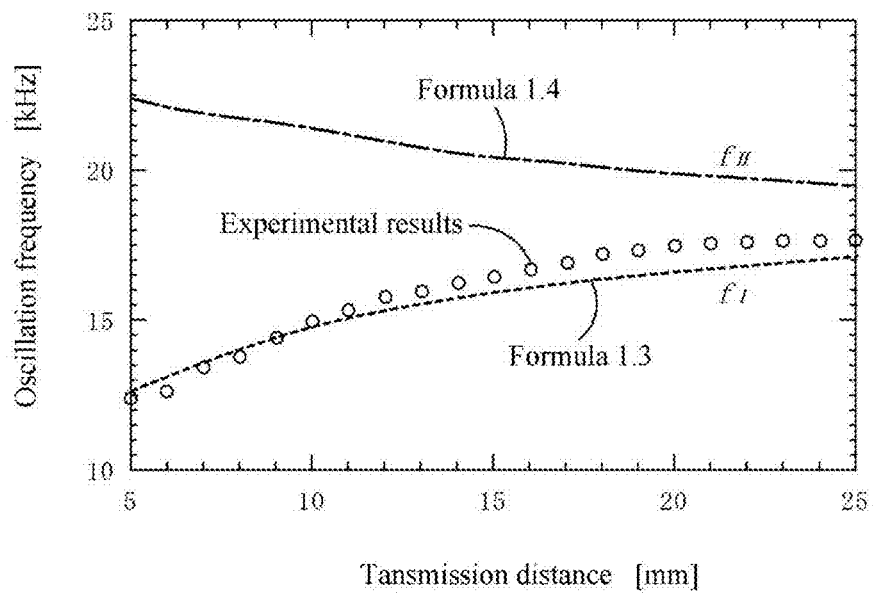
[FIG. 4]
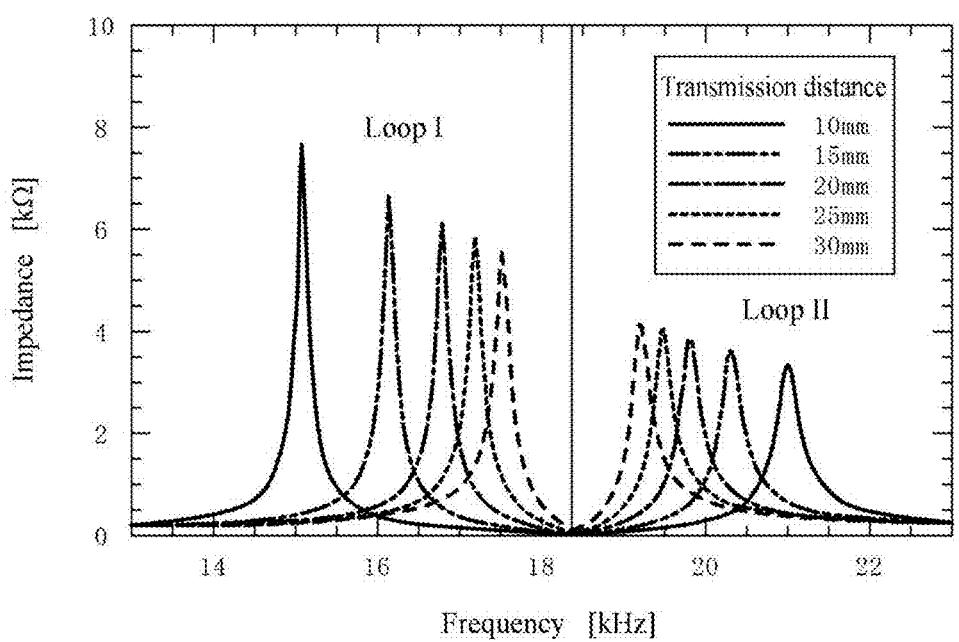

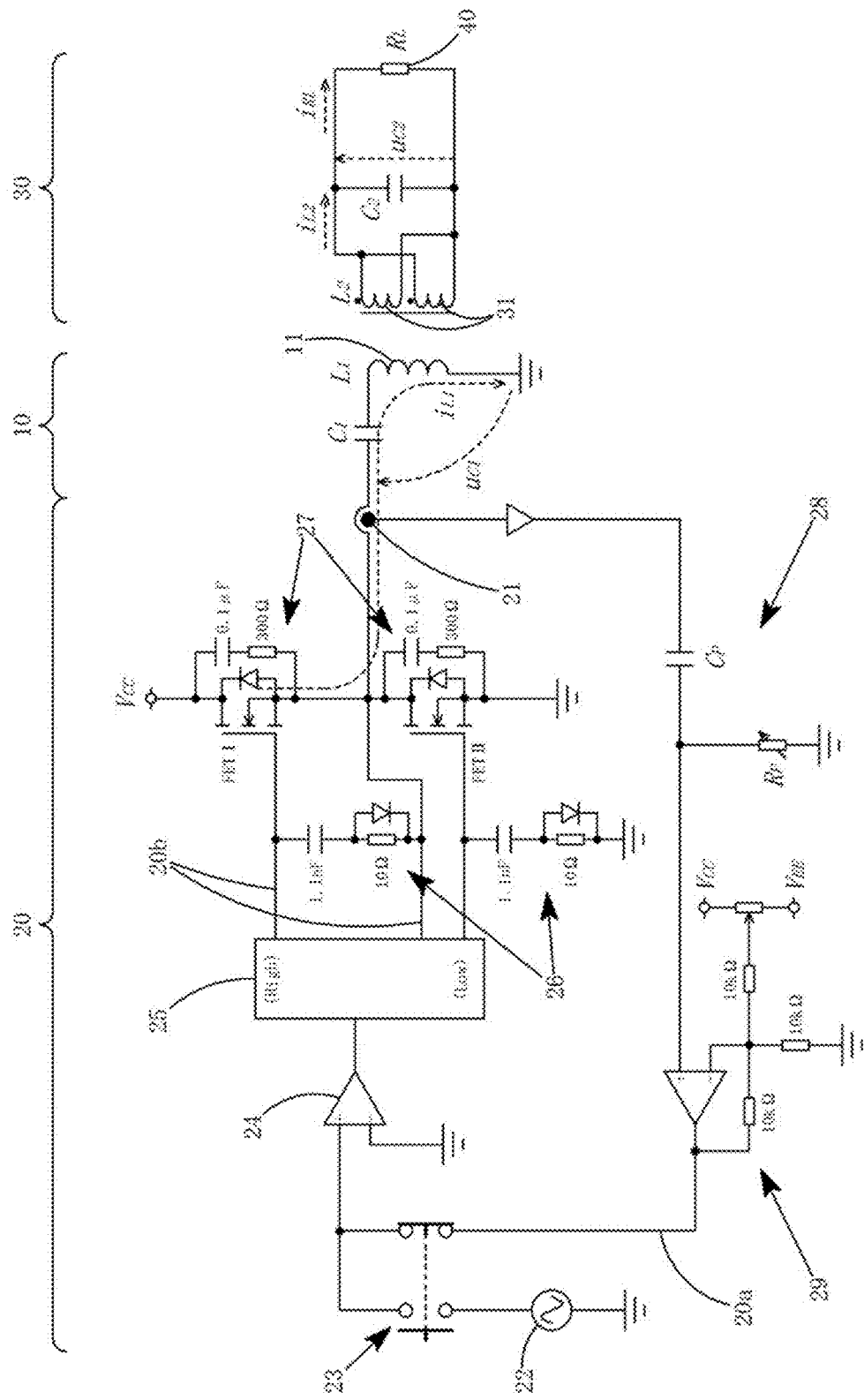
[FIG. 5]

[FIG. 6]
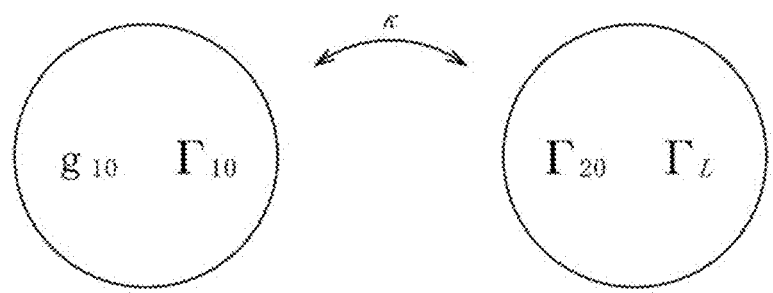
[FIG. 7]
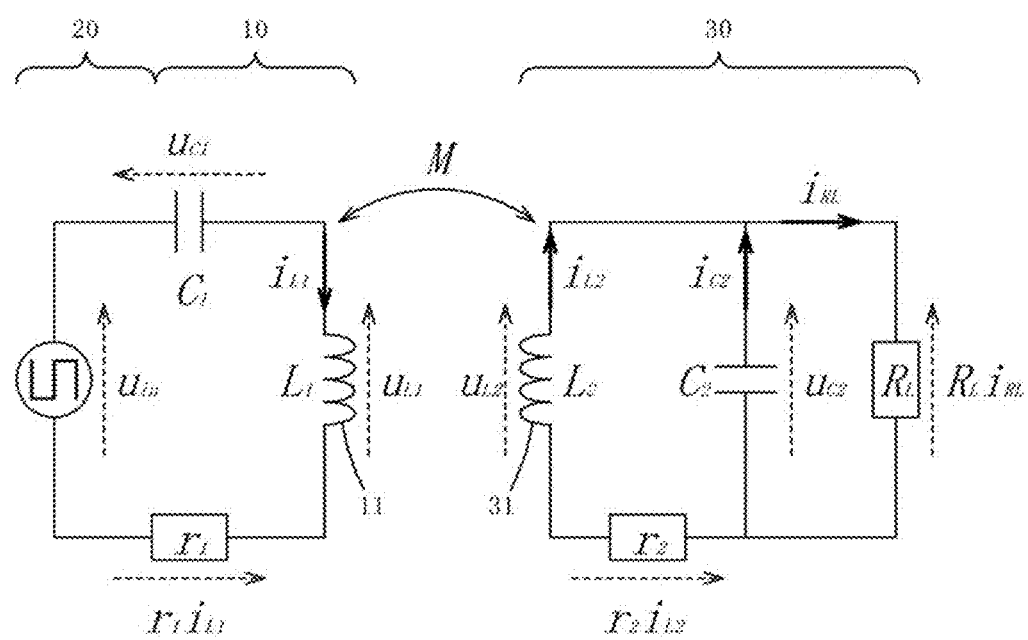

[FIG. 8]
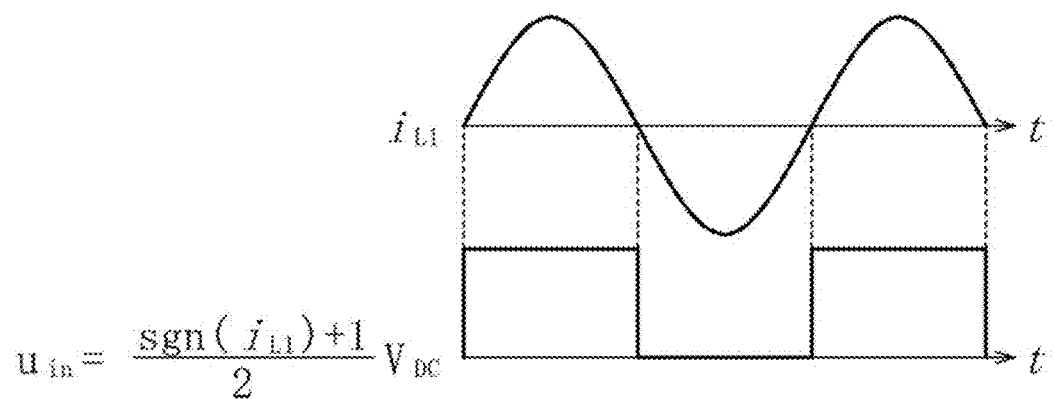

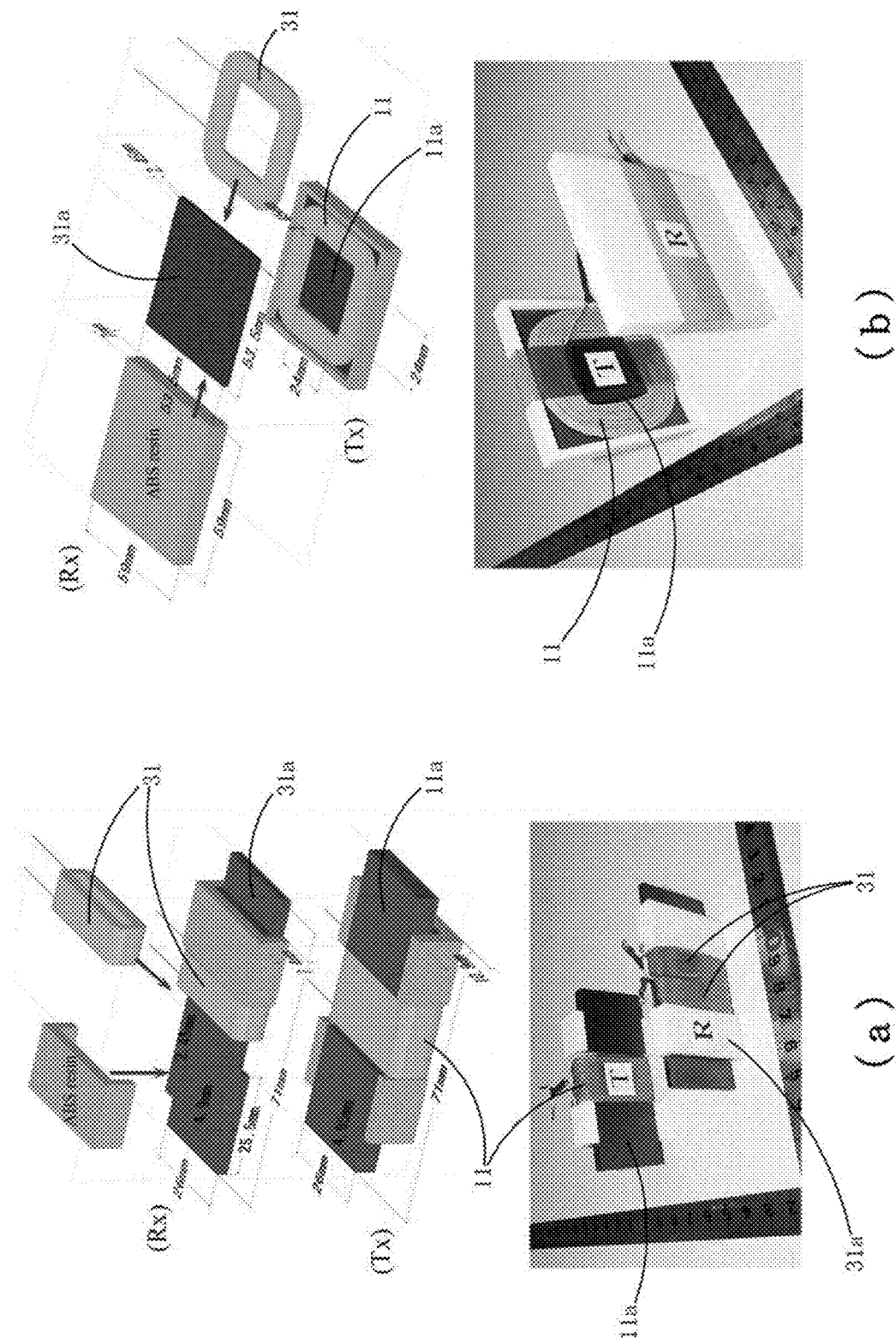
[FIG. 9]

[FIG. 10]
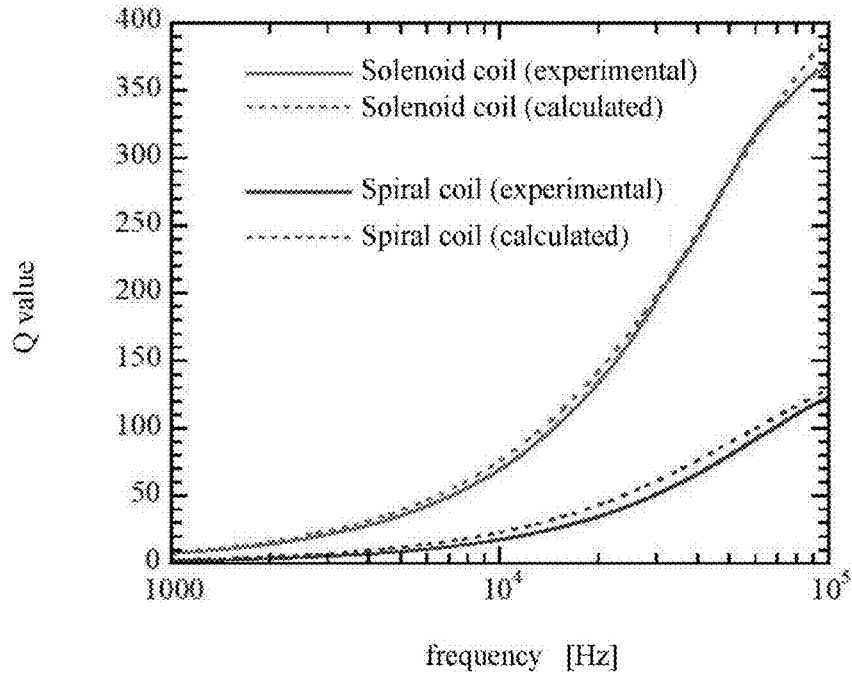
[FIG. 11]
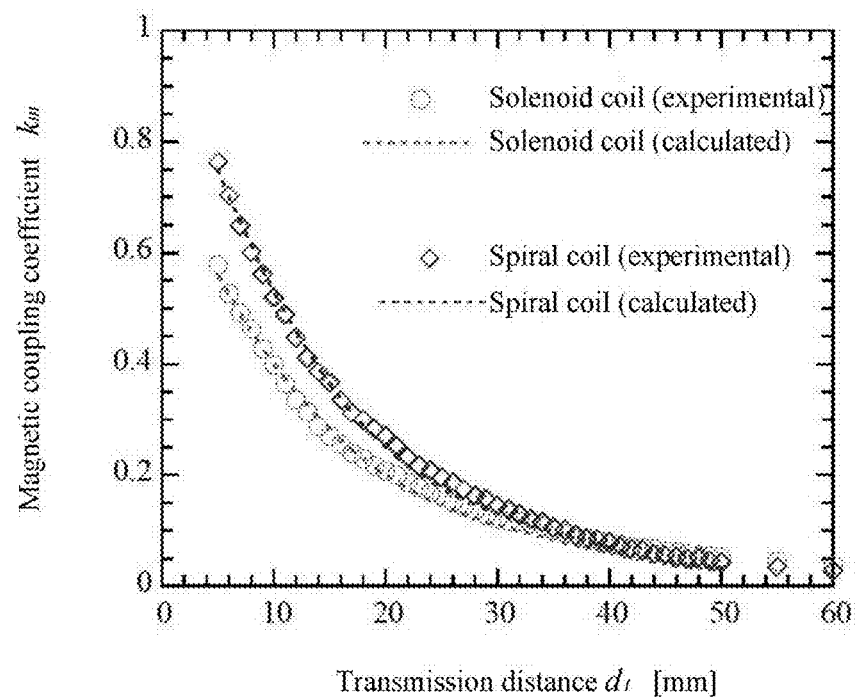

[FIG. 12]
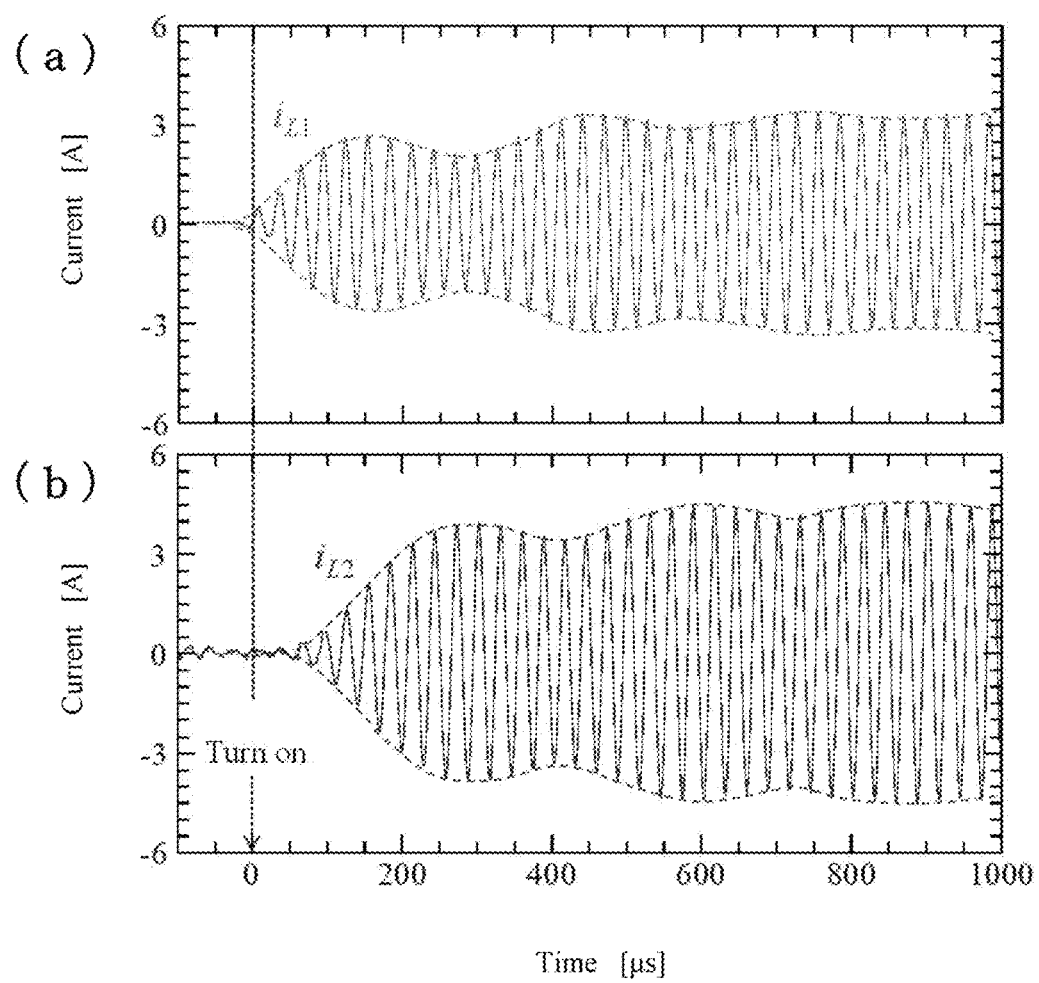

[FIG. 13]
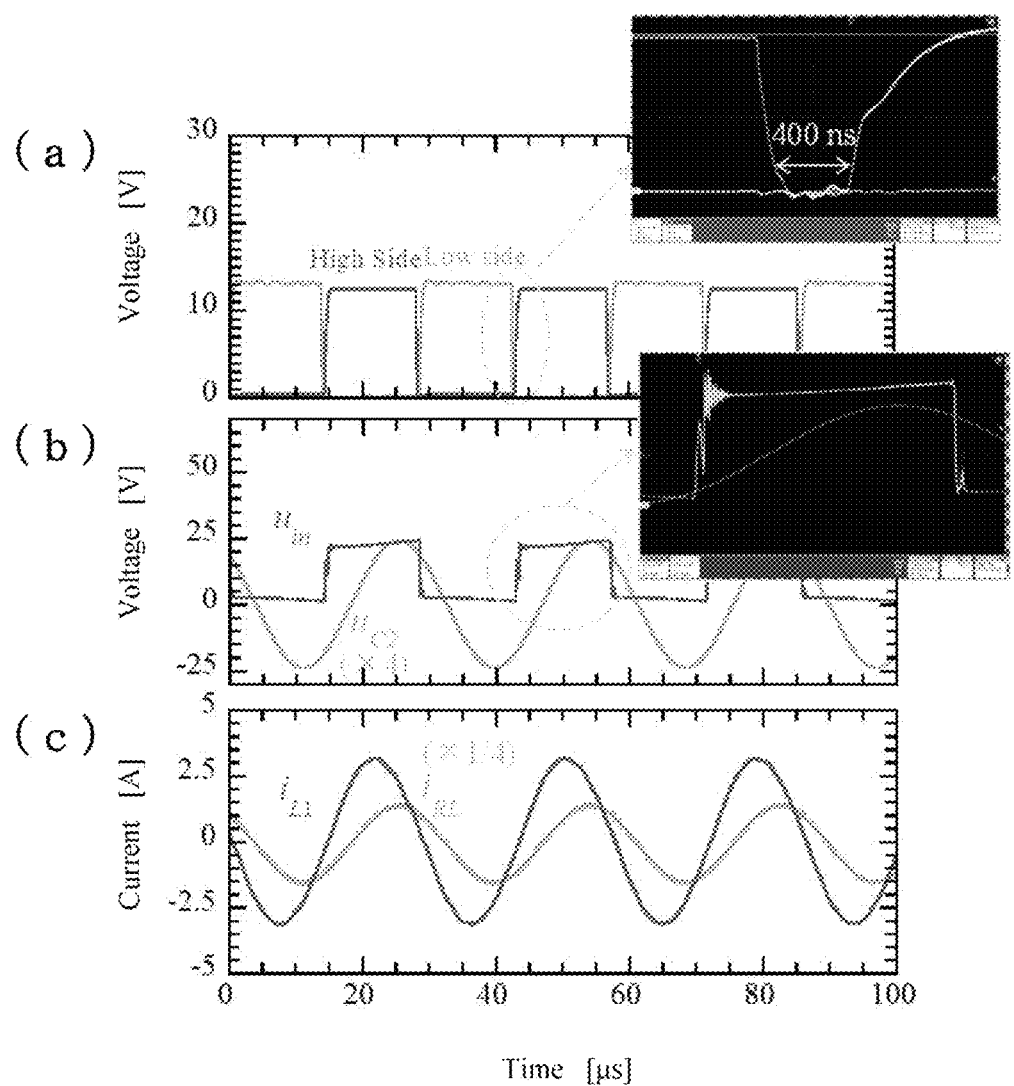

[FIG. 14]
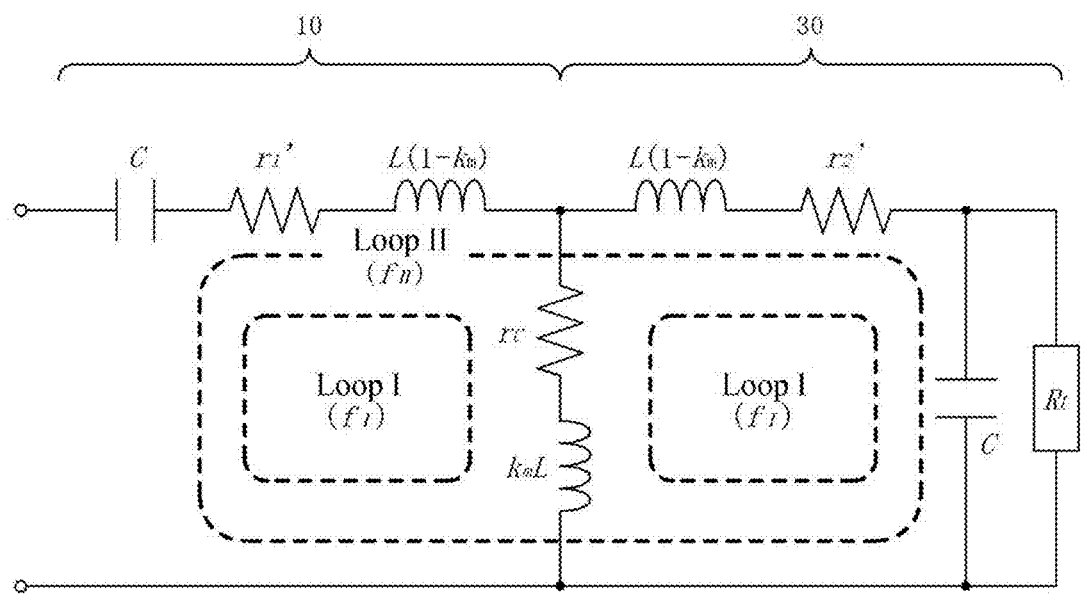
[FIG. 15]
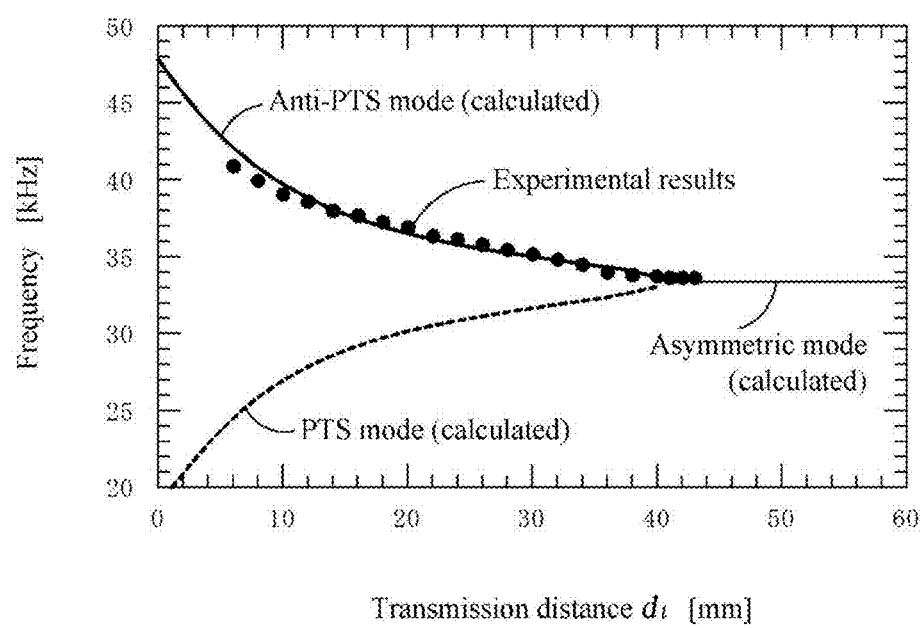

[FIG. 16]
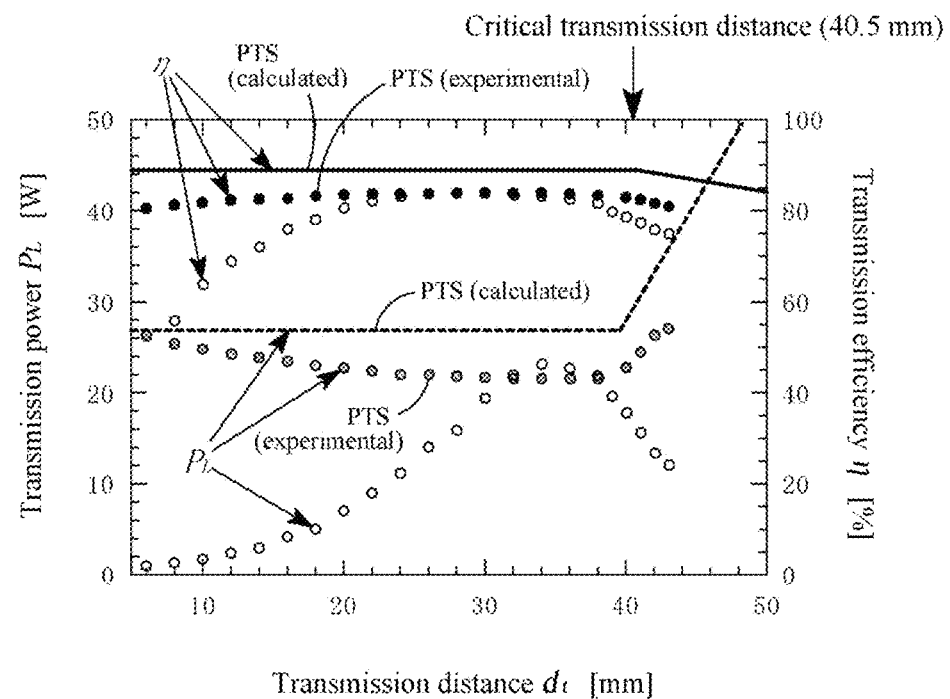
[FIG. 17]
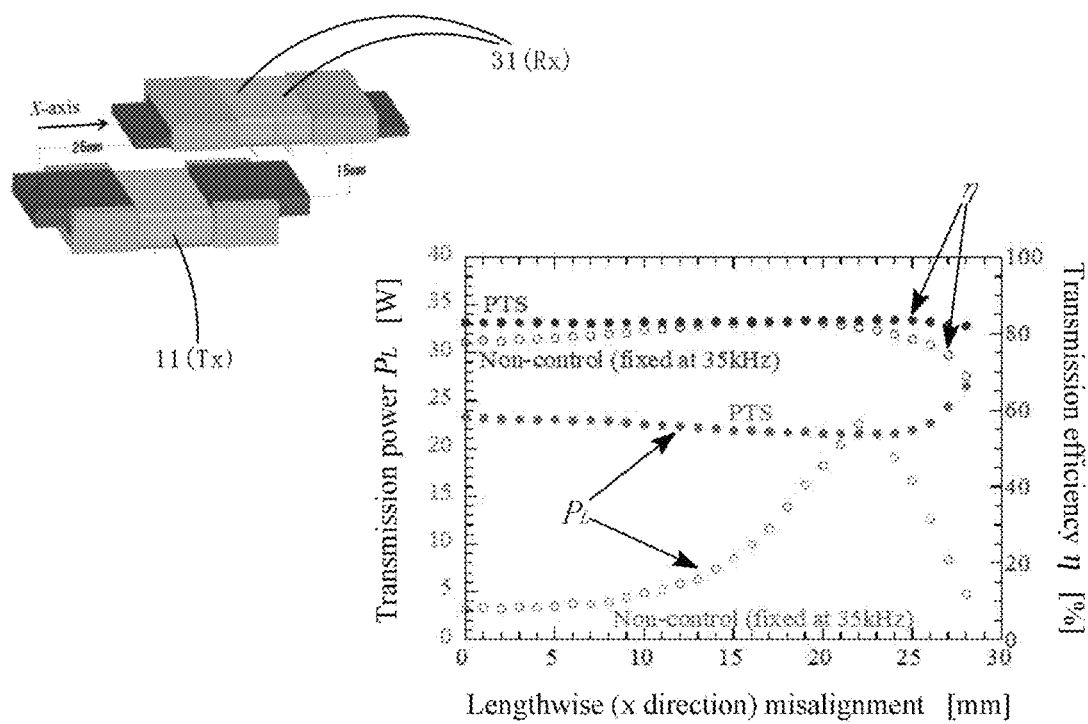

[FIG. 18]
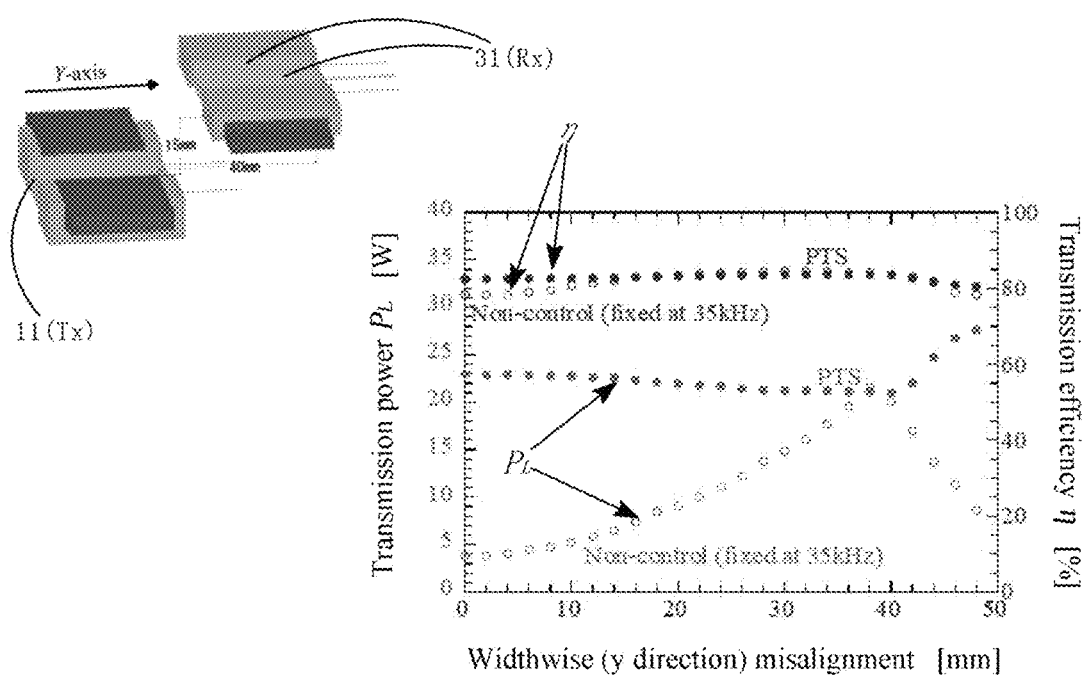
[FIG. 19]
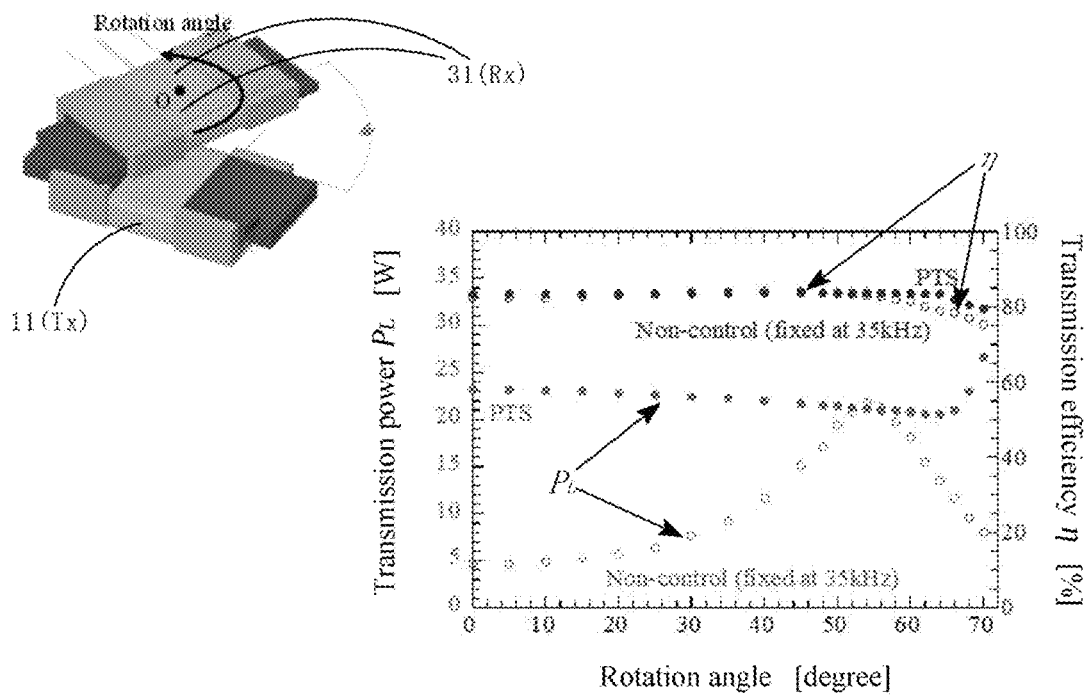

[FIG. 20]
(a)
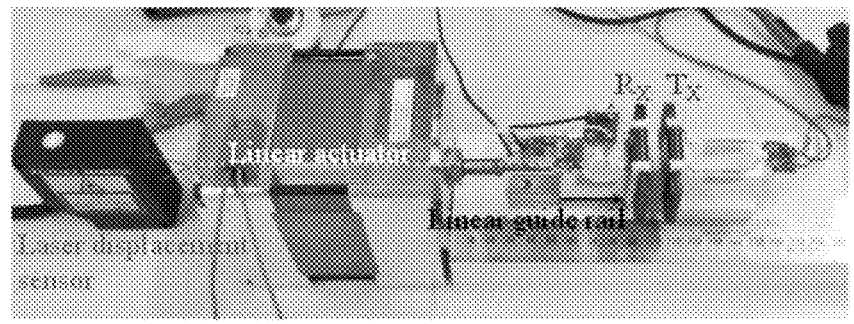
(b)
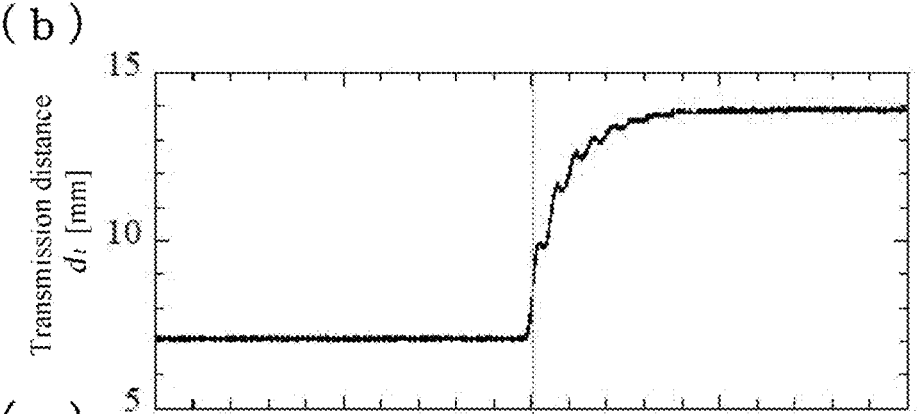
(c)
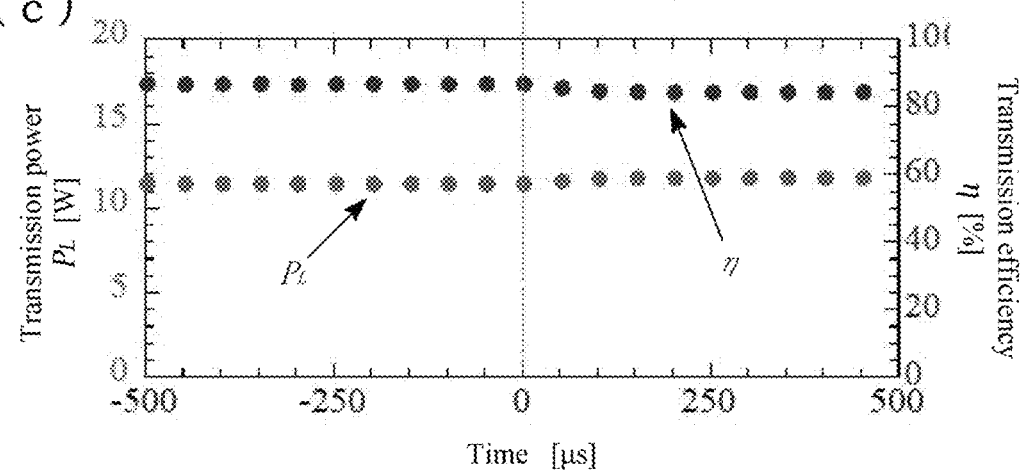

MAGNETIC RESONANCE WIRELESS POWER TRANSFER DEVICE

TECHNICAL FIELD

The present disclosure relates to a magnetic resonance wireless power transfer device for performing contactless power transfer by magnetically resonating a transmitter coil and a receiver coil.

BACKGROUND

Wireless power transfer devices, which supply electric power to electronic equipment in a contactless (wireless) manner without intervention of power cords, are now being put to practical use. Wireless power transfer devices are roughly classified into two types by its power transfer methods: a radiative type, which transfers energy via a radio wave (microwave) or a laser beam, and a non-radiative type, which transfers energy via electric or magnetic fields. Of these, radiative type wireless power transfer devices are still in the research stage, because, with the current technology, their energy loss is too large and it is difficult to increase the efficiency of power transfer. In contrast, non-radiative type wireless power transfer devices have been put to practical use in familiar equipment such as smart phones and electric toothbrushes.

Non-radiative type wireless power transfer devices that transfer energy via magnetic fields are further classified into an electromagnetic induction type and a magnetic resonance type. In an electromagnetic induction wireless power transfer device, an alternating current applied to a transmitter coil changes the magnetic flux penetrating the transmitter coil, which changes the magnetic flux penetrating a receiver coil located near the transmitter coil. This causes an induced current to flow through the receiver coil, resulting in electric power transfer from the transmitter coil to the receiver coil. Meanwhile, a magnetic resonance wireless power transfer device is configured with a transmitter resonant circuit including a transmitter coil, and a receiver resonant circuit including a receiver coil having the same resonance frequency as that of the transmitter coil. When an alternating current is applied to its transmitter coil, the transmitter resonant circuit and the receiver resonant circuit are resonated by the generated alternating magnetic field, and thereby performing power transfer.

Magnetic resonance wireless power transfer devices have an advantage over electromagnetic induction wireless power transfer devices in that they may transfer power with higher efficiency even when the transmission distance is long. In addition, they have good robustness against misalignment between the transmitter coil and the receiver coil. Magnetic resonance wireless power transfer devices are thus expected to be used in applications where the transmission distance is not easy to be shorten and the relative positions of the transmitter and receiver coils are not fixed, such as supplying power to a moving object like a car.

In conventional magnetic resonance wireless power transfer devices, however, the amount of transferred power strongly depends on the transmission distance. The transferred power therefore should be controlled to be constant in applications where the transmission distance changes, which not only requires a computer for such control, but also causes problems of increased power consumption and cost. In addition, the response speed of conventional computer-based control depends on the processing capability of the computer, which may not be sufficient to keep up with sudden changes in the transmission distance. In view of this situation, magnetic resonance wireless power transfer devices based on the principle of PT (Parity-Time) symmetry (hereinafter sometimes referred to as "PT symmetric wireless power transfer devices") have recently been proposed (see Non-Patent Literature 1) and are attracting attention. Here, PT symmetry refers to a combination of two symmetries: a space-reversal symmetry, which means that the laws of physics do not change when the spatial coordinates are reversed, and a time-reversal symmetry, which means that the laws of physics do not change when the direction of time flow is reversed.

In PT symmetric wireless power transfer devices, the oscillation frequency is automatically adjusted so that the transferred power stays constant even when the transmission distance changes. This eliminates the need for a computer for frequency tracking control, and thus allows to save power and cost. In addition, quick responses, which may keep up with sudden changes in the transmission distance, may be expected.

In PT symmetric wireless power transfer device, an alternating current power supply in the conventional magnetic resonance wireless power transfer device is replaced with a negative resistor. A resistor with a negative resistance value, however, does not actually exist. Thus, in practice, a negative resistance circuit, which behaves electrically similar to a negative resistor, is used. When an alternating current power supply is employed as in the case of conventional magnetic resonance wireless power transfer devices, the driving frequency is fixed at a specific value, and thus PT-symmetry is not preserved. In contrast, when the alternating current power supply is replaced by a negative resistance circuit, the driving frequency (oscillation frequency) is no longer fixed at a specific value, satisfying one of the necessary conditions for preserving PT symmetry.

It is already known that a negative resistance circuit may be realized with a circuit consisting only of an operational amplifier and a plurality of resistors (see Non-Patent Literature 1). The above circuit consisting only of an operational amplifier and a plurality of resistors, however, has a disadvantage of large power loss. As a practical negative resistance circuit with low power loss, a circuit configured with a current sensor, a zero-crossing comparator, a half-bridge circuit having a plurality of transistors, and a gate signal generation circuit for generating a gate signal for said transistors based on the output voltage of the zero-crossing comparator has already been proposed (see Non-Patent Literature 2).

Since conventional PT symmetric wireless power transfer devices are driven at high frequency of about 1 to 3 MHZ, they employ air-core coils for their transmitter and receiver coils, which require these coils to have large dimension. As a result, they have a disadvantage in that their applicable applications are limited (see Non-Patent Literature 1 and 2). In addition, because of the high frequency, they have another disadvantage in that if a metallic object (conductive object) is placed around the transmitter coil and the receiver coil, the transmission efficiency is reduced due to eddy current loss caused by the conductive object.

CITATION LIST

Non-Patent Literature

Non-Patent Literature 1: S. Assawaworrarit, X. Yu, and S. Fan, "Robust wireless power transfer using a nonlinear parity-time symmetric circuit" Nature, 546, 387 (2017)

Non-Patent Literature 2: J. Zhou, B. Zhang, W. Xiao, D. Qiu, and Y. Chen, IEEE Transactions on Industrial Electronics, 66(5), 4097-4107(2019)

SUMMARY

Technical Problem

In response to the problem above, one or more aspects of the present disclosure are directed to providing a magnetic resonance wireless power transfer device which may be driven at low frequency and thereby allowing constant transmission power and high transmission efficiency to be maintained over a long transmission distance. Other aspects of the present disclosure are directed to a magnetic resonance wireless power transfer device whose transmitter coil and receiver coil may be miniaturized and thereby having good practicality, such as applicability in a variety of applications.

Solution to Problem

The above-mentioned problem may be solved by providing
a magnetic resonance wireless power transfer device, wherein
a negative resistance circuit,
a transmitter resonant circuit having a transmitter coil, and
a receiver resonant circuit having a receiver coil are configured so that the parity-time symmetry is preserved,
and wherein
out of two resonant loops (hereinafter referred to as "Loop I" and "Loop II") in which a resonant current is circulatable when the transmitter resonant circuit and the receiver resonant circuit are regarded as a double resonant circuit coupled with a mutual inductance, Q value of the Loop II is set to be higher than Q value of the Loop I, so that oscillation occurs in a loop in which a leakage inductance component of the coil and a capacitance component of a capacitor resonate.

The reason is explained hereinafter. Here, priority is given to clarity rather than rigor, so the explanation is given in use with an equivalent circuit. As oscillation frequency in each of Mode I and Mode II cannot be expressed as a rigorous mathematical formula without using a theory called coupled mode theory (CMT), it should be noted that Formulas 1.3 and 1.4, which appear below, are not rigorous. A more rigorous explanation using CMT is given in "Theoretical Analysis of PT symmetric Wireless Power Transfer" in "DETAILED DESCRIPTION".

The magnetic resonance wireless power transfer device illustrated in FIG. 1 comprises a primary (transmitter) circuit 10, 20 and a secondary (transmitter) circuit 30. The primary circuit 10, 20 includes a transmitter resonant circuit 10 having a transmitter coil 11 and a negative resistance circuit 20. The negative resistance circuit 20 in the embodiment illustrated in FIG. 1 is consists only of an operational amplifier and a plurality of resistors. The secondary circuit 30 is a receiver resonant circuit 30 having a receiver coil 31.

In the magnetic resonance wireless power transfer device of FIG. 1, a capacitor is connected in parallel with the transmitter coil 11, and another capacitor is connected in parallel with the receiver coil 31. This circuit configuration is sometimes referred to as "Parallel-Parallel topology (PP topology)". Other circuit configurations besides the PP topology include one with a capacitor connected in serial to the transmitter coil 11 and another capacitor connected in parallel with the receiver coil 31. This circuit configuration is sometimes referred to as "Serial-Parallel topology (SP topology)". There is another circuit configuration with a capacitor connected in serial to the transmitter coil 11 and another capacitor connected in serial to the receiver coil 31. This circuit configuration is sometimes referred to as "Serial-Serial topology (SS topology)".

Based on the relationship between an input voltage $V_{in}$ and an input current $I_{in}$ both input from the negative resistance circuit 20 to the transmitter resonant circuit 10 in FIG. 1, an apparent negative resistance $R_n$ of the negative resistance circuit 20 may be defined as described in the following Formula 1.1.

[Mathematical Expression 1]

$$\frac{V_{in}}{I_{in}} = -\frac{R_1}{R_2}R_f = Rn \quad (1.1)$$

As described in the following Formula 1.2, oscillation occurs under conditions where the value of $-R_n$ is greater than $R_e$, an equivalent resistance component viewed from the input end of the transmitter resonant circuit 10. This phenomenon is widely known as negative resistance oscillation. In the following Formula 1.2, $k_m$ denotes a magnetic coupling coefficient and $R_L$ denotes a load resistance.

[Mathematical Expression 2]

$$-R_n > R_e \approx k_m^2 R_L \quad (1.2)$$

As illustrated in FIG. 2, the transmitter resonant circuit 10 and the receiver resonant circuit 30 illustrated in FIG. 1 may be expressed as the double resonant circuit coupled with the mutual inductance $k_m L$ (the mutual inductance is sometimes denoted by M hereinafter). In FIG. 2, L denotes self-inductance of each of the transmitter coil 11 (FIG. 1) and the receiver coil 31 (FIG. 1). $L(1-k_m)$ represents leakage inductance of each of the transmitter coil 11 (FIG. 1) and the receiver coil 31 (FIG. 1). r1' and r2' denote winding resistances of the transmitter coil 11 (FIG. 1) and the receiver coil 31 (FIG. 1), respectively. $r_c$ denotes an equivalent core loss resistance. C denotes the capacitance (electrostatic capacitance) of the capacitor. In the circuit of FIG. 2, there are two resonant loops (the Loop I and the Loop II) in which the resonant current is circulatable. In the following, a mode in which the resonant current circulates in the Loop I is sometimes referred to as "Mode I", and a mode in which the resonant current circulates in the Loop II is sometimes referred to as "Mode II".

A resonance frequency $f_I$ in Mode I and a resonance frequency $f_{II}$ in Mode II may be expressed by the following Formula 1.3 and Formula 1.4, respectively, using the magnetic coupling coefficient $k_m$ as well as L and C. The following Formulas 1.3 and 1.4 may be obtained immediately considering that Mode I is a mode in which $k_m L$ and two series resonant circuits (the resonant circuit in which $L(1-k_m)$ and C are connected in series) resonate in parallel, and Mode II is a mode in which $L(1-k_m)$ and C resonate in parallel. In FIG. 2, for the sake of simplicity in explaining the principle, L and C are each treated as the same value in the transmitter resonant circuit 10 and the receiver resonant circuit 30, but in practice they do not necessarily need to be the same.

[Mathematical Expression 3]

$$f_I = \frac{1}{2\pi\sqrt{L(1-k_m)C}} \quad (1.3)$$

[Mathematical Expression 4]

$$f_{II} = \frac{1}{2\pi\sqrt{L(1+k_m)C}} \quad (1.4)$$

FIG. 3 presents relationship between transmission distance and oscillation frequency in each of the cases where operation is performed at the resonance frequency $f_I$ of the Loop I and where operation is performed at the resonance frequency $f_{II}$ of the Loop II, obtained from experiments and calculations. The experimental results in FIG. 3 indicate that the device oscillates in Mode I at all the transmission distances studied. The inventor presumed that there would also be an experimental condition in which resonance would occur in Mode II.

FIG. 4 presents frequency response of resonance impedance in the Loop I and the Loop II, obtained from experiments. In this experiment, the impedance was measured at the input end of the transmitter resonant circuit 10. The load resistance $R_L$ was measured while disconnected from the receiver resonant circuit 30. The resonance peaks appeared bidirectionally in the region of the resonance frequency $f_I$ of the Loop I and in the region of the resonance frequency $f_{II}$ of the Loop II. Since the sharpness of this resonance peak reflects the Q value of the resonant circuit, it may be said that the resonant loop with sharper resonance peaks has a higher Q value.

It was not previously revealed which of Mode I and Mode II is selected. The inventor has found, based on the frequency response of resonance impedance as presented in FIG. 4, that the resonance loop with higher Q value is selected between the Loop I and Loop II. More specifically, under the condition with the frequency response of resonance impedance as presented in FIG. 4, the resonance peak of Loop I is higher and sharper than that of Loop II at all the transmission distances studied. This means that the Q value of the Loop I is higher than that of the Loop II in this experimental example. Under this condition, $f_I$ (Mode I) is always selected as the oscillation frequency, as indicated in the experimental results in FIG. 3. When the equivalent core loss resistance $r_c$ (FIG. 2) was tentatively increased from 0.2Ω to 2.2Ω using the circuit simulator, it was observed that the mode shifted from Mode I ($f_I$) to Mode II ($f_{II}$). This result is not inconsistent with the discussion above. It has also been experimentally confirmed that oscillation in mode II ($f_{II}$) is selectable (the details of the experimental results are discussed later with reference to FIG. 15 below).

The magnetic resonance wireless power transfer device of the present disclosure is designed to oscillate in Mode II. Use of Mode II allows the magnetic resonance wireless power transfer device to be suitably used even in applications with long transmission distances.

Since $k_m$ in Formulas 1.3 and 1.4 above is the magnetic coupling coefficient, the frequency in Mode I (Formula 1.3 above) shifts in the direction of increasing as the transmission distance increases, whereas the frequency in Mode II (Formula 1.4 above) shifts in the direction of decreasing as the transmission distance increases. This tendency is also indicated in FIG. 3. For the load resistance, there is an optimum value at which the efficiency is maximized, namely an optimum load resistance value. In wireless power transfer circuits of SP topology, the optimum load resistance value may be obtained by the following Formula 1.5.

[Mathematical Expression 5]

$$R_L = \frac{1}{\omega C}\sqrt{\frac{1}{k_m^2}+1} \quad (1.5)$$

It may be understood from Formula 1.5 above that the optimum load resistance value proceeds in the direction of increasing as the frequency decreases. The actual value of the load resistance may be set higher than this optimum load resistance value in order to preserve PT symmetry. By setting the self-inductance of the coil smaller and the load resistance larger, the transmission distance over which PT symmetry is preserved is allowed to be extended (detailed explanation for this is provided in "Theoretical Analysis of PT symmetric Wireless Power Transfer" in "DETAILED DESCRIPTION"). In Mode II, the frequency shifts in the direction of decreasing as the transmission distance increases, which means that as the transmission distance increases, the optimum load resistance value approaches the actual load resistance value and the efficiency increases. In Mode I, the opposite is true, which means that as the transmission distance increases, the efficiency decreases. Mode II is therefore more advantageous for applications with long transmission distances.

In one or more embodiments of the magnetic resonance wireless power transfer device, the driving frequency may be set to 100 kHz or lower. Operating at such low frequency allows Mode II more likely to be selected continuously.

In conventional PT symmetric wireless power transfer devices, since coils are driven at high frequency, air-core coils are employed for their transmitter and receiver coils. When employing air-core coils, the equivalent core loss resistance $r_c$ in FIG. 2 is zero, so Mode I is always selected while Mode II is not selectable. This is also confirmed by the experimental results presented in Non-Patent Literature 1 and 2. Driving at low frequency allows the transmitter coil and the receiver coil to be each wound on a magnetic core. This results in a finite value of $r_c$. The winding resistances r1' and r2' in FIG. 2 are allowed to be smaller than those of the air-core coils, because the coil diameter is allowed to be reduced by winding the coils each on the magnetic cores. Under this condition, the Q value of the Loop II becomes higher than that of the Loop I, and thus Mode II becomes selectable.

In addition, lower drive frequency has practical benefits because it reduces power loss at electronic components included in the negative resistance circuit, such as a transistor.

Moreover, winding the transmitter coil and the receiver coil each on magnetic cores allows the size of the coils to be reduced and may thereby increase the practicality of the magnetic resonance wireless power transfer device.

In one or more embodiments of the magnetic resonance wireless power transfer device, a capacitor may be connected in parallel with the receiver coil, and the receiver coil may be configured with a plurality of windings cumulatively connected in parallel with each other. Alternatively, the receiver coil may be configured with a bundle of wires (a wire rod having a plurality of wires (single wires) bundled together) (i.e., the receiver coil may be formed by winding a bundle of wires). These configurations allow the winding resistance of the receiver coil to be reduced, making Mode II even more likely to be selected. In addition, the self-inductance of the receiver coil is allowed to be reduced, allowing PT symmetry more likely to be preserved over long transmission distances. When the receiver coil is configured with a bundle of wires, the bundle of wires may be one in which each of the wires (single wires) has an insulating coating, which may be more effective.

In one or more embodiments of the magnetic resonance wireless power transfer device, the negative resistance circuit may comprise
- a current sensor,
- a zero-crossing comparator for receiving a current waveform signal of the transmitter coil detected by the current sensor,
- a gate signal generation circuit for generating a gate signal for transistors based on an output voltage of the zero-crossing comparator, and
- a switching circuit configured with a plurality of transistors for driving the transmitter coil with an alternating current in response to the gate signal output by the gate signal generation circuit.

This allows power loss in said transistors to be reduced in low-frequency range, and thereby allowing power conversion efficiency to be increased.

The negative resistance circuit may be provided with a trigger mechanism for activation. This allows to activate the magnetic resonance wireless power transfer device even when driven at low frequency.

The negative resistance circuit may further comprise a phase lead compensation circuit for lead compensation of delay of said gate signal. Delay of the gate signal sometimes causes a large phase difference between the gate signal and the alternating current flowing through the transmitter coil, making it less easy to preserve PT symmetry. In this regard, providing the phase lead compensation circuit above allows PT symmetry to be preserved.

The negative resistance circuit may further comprise a direct current offset adjustment circuit. The zero-crossing comparator outputs a pulse-wave voltage signal, and a duty ratio of this voltage signal is desired to be 1:1 (50%). If the duty ratio deviates from 50%, the transmission power may decrease. The direct current offset adjustment circuit allows the duty ratio of the voltage signal output from the zero-crossing comparator to be adjusted toward 50%.

The negative resistance circuit may further comprise a snubber circuit connected to a gate signal line of said transistor. This allows chattering noise generated during the zero-crossing detection of the zero-crossing comparator to be removed, and alternating current power with less noise superposition to be supplied to the load.

Advantageous Effects

As described above, the device of the present disclosure allows PT symmetry to be preserved over wide transmission distance range at low frequency, and thus allows constant transmission power and high transmission efficiency to be maintained even in applications where the transmission distance changes. The present disclosure also allows to provide a magnetic resonance wireless power transfer device whose transmitter coil and receiver coil may be miniaturized and thereby having good practicality, such as applicability in a variety of applications.

BRIEF DESCRIPTION OF THE DRAWINGS

FIG. 1 is a figure illustrating an example of an electrical circuit of a magnetic resonance wireless power transfer device with PT symmetry, which includes a negative resistance circuit.

FIG. 2 is a figure illustrating an equivalent circuit of PP topology.

FIG. 3 is a graph presenting relationship between transmission distance and oscillation frequency in each of the cases where operation is performed at resonance frequency $f_I$ of the Loop I of FIG. 2 and where operation is performed at resonance frequency $f_{II}$ of the Loop II of FIG. 2, obtained from experiments and calculations.

FIG. 4 is a graph presenting frequency response of resonance impedance in the Loop I and the Loop II of FIG. 2, obtained from experiments.

FIG. 5 is a figure illustrating an electrical circuit of an embodiment of the magnetic resonance wireless power transfer device.

FIG. 6 is a figure illustrating a model based on coupled mode theory for a PT symmetric wireless power transfer device.

FIG. 7 is a figure illustrating SP topology.

FIG. 8 is a figure illustrating relationship between input voltage $u_{in}$ and transmitter coil current $i_{L1}$ in FIG. 6.

FIG. 9 is schematic diagrams and photographs of the coils used in the experiment.

FIG. 10 is a graph presenting frequency response of Q value of a receiver coil (Rx coil), obtained from experiments and calculations.

FIG. 11 is a graph presenting relationship between magnetic coupling coefficient $k_m$ and transmission distance $d_t$, obtained from experiments and calculations.

FIG. 12 is graphs presenting oscilloscope observations on oscillations of transmitter coil current $i_{L1}$ and receiver coil current $i_{L2}$ immediately after a trigger button was pressed.

FIG. 13 is graphs presenting waveforms of gate signal, as well as input voltage $u_{in}$, receiver capacitor voltage $u_{C2}$, transmitter coil current $i_{L1}$, and load current $i_{RL}$ in steady state, obtained from experiments.

FIG. 14 is a figure illustrating an equivalent circuit of SP topology.

FIG. 15 is a graph presenting relationship between transmission distance $d_t$ and oscillation frequency, obtained from experiments and calculations.

FIG. 16 is a graph presenting variations in transmission power $P_L$ and transmission efficiency η versus transmission distance $d_t$, obtained from experiments and calculations.

FIG. 17 is a graph presenting variations in transmission power $P_L$ and transmission efficiency η with respect to lateral misalignment of a transmitter coil and a receiver coil in lengthwise direction (x direction).

FIG. 18 is a graph presenting variations in transmission power $P_L$ and transmission efficiency η with respect to lateral misalignment of a transmitter coil and a receiver coil in widthwise direction (y direction).

FIG. 19 is a graph presenting variations in transmission power $P_L$ and transmission efficiency η with respect to lateral rotation of a transmitter coil and a receiver coil.

FIG. 20 (*a*) is a figure illustrating an experimental setup used to study the tracking performance of transmission power and transmission efficiency when transmission distance suddenly changed, (b) is a graph presenting changes in transmission distance versus time, and (c) is a graph presenting variations in transmission power and transmission efficiency versus time.

DETAILED DESCRIPTION

1. Embodiments of the Magnetic Resonance Wireless Power Transfer Device

Embodiments of the magnetic resonance wireless power transfer device are described in more detail below with reference to drawings. FIG. 5 is a figure illustrating an electrical circuit of an embodiment of the magnetic resonance wireless power transfer device. The magnetic resonance wireless power transfer device of the present embodiment comprises a primary (transmitter) circuit 10, 20 and a secondary (transmitter) circuit 30 as illustrated in FIG. 5. The primary circuit 10, 20 includes a transmitter resonant circuit 10 having a transmitter coil 11 and a negative resistance circuit 20. The secondary circuit 30 is a receiver resonant circuit 30 having a receiver coil 31. A load resistance 40 is connected to the receiver resonant circuit 30.

The negative resistance circuit 20 comprises a current sensor 21, an oscillator 22, a trigger mechanism 23, a zero-crossing comparator 24, a gate signal generation circuit 25, snubber circuits 26, a switching circuit 27, a phase lead compensation circuit 28 and a direct current offset adjustment circuit 29, which are connected as illustrated in FIG. 5. Note that the oscillator 22 and the trigger mechanism 23 are not circuit elements needed for realizing negative resistance, but are circuit elements needed for activating the negative resistance circuit 20.

The current sensor 21 is a sensor for detecting the current waveform of the transmitter coil 11. This current sensor 21 has a function of converting a current flowing through the transmitter coil 11 into a voltage signal and outputting it.

The oscillator 22 functions as an alternating current power supply that outputs a low-frequency alternating voltage. Frequency of the alternating voltage output by the oscillator 22 is not particularly limited. The frequency of the oscillator 22 may be set to as low as 100 kHz or lower, in the scope of facilitating selection of Mode II described above and reducing power loss in the switching circuit 27. If the frequency of the oscillator 22 is too low, however, the magnetic resonance wireless power transfer device may become less easy to activate. In some embodiments, therefore, the frequency of the oscillator 22 is set to be 20 KHz or higher. In the present embodiment, the oscillator 22 is set to produce the alternating voltage having sinusoidal waveform with a frequency of 33 kHz and an amplitude of 100 mV.

The trigger mechanism 23 is a mechanism for triggering oscillation of the negative resistance circuit 20 and thereby activating the magnetic resonance wireless power transfer device. In the present embodiment, a momentary switch (a switch having a mechanism that turns the switch ON only for a moment when its trigger button is pressed) is employed as the trigger mechanism 23. When the momentary switch is turned ON, the alternating voltage from the oscillator 22 is input to a non-inverting input terminal of the zero-crossing comparator 24 only at the moment, and a pulse-wave voltage signal is output from the zero-crossing comparator 24. This voltage signal is input to the gate signal generation circuit 25, and a pulse-wave gate signal for driving the switching circuit 27 is momentarily output from the gate signal generation circuit 25. This gate signal momentarily drives the switching circuit, and alternating current momentarily flows into the transmitter coil 11. Next moment, the trigger button is turned OFF and the oscillator 22 and the zero-crossing comparator 24 are disconnected. At the same time, a feedback line 20a is connected to the non-inverting input terminal of the zero-crossing comparator 24, and an alternating voltage generated from the alternating current that has flowed through the transmitter coil 11 is input into the zero-crossing comparator 24, and thus the oscillation is maintained.

The switching circuit 27 is a circuit for switching a current $i_{L1}$ supplied to the transmitter coil 11. In the present embodiment, the switching circuit 27 is configured with a plurality of transistors (FETI and FETII in FIG. 5) in a half-bridge arrangement. The gate signal generation circuit 25 is a circuit for generating the gate signal for the transistors (FETI and FETII) in the switching circuit 27 based on the pulse-wave voltage signal output from the zero-crossing comparator 24. In addition to generating the gate signal described above, this gate signal generation circuit 25 is also in charge of generating time (dead time) between ON/OFF switching of the plurality of transistors included in the switching circuit 27.

The snubber circuits 26 are each connected to gate signal lines 20b of the transistors (FETI and FETII in FIG. 5) included in the switching circuit 27. In the present embodiment, each of the snubber circuits 26 is configured with a capacitor, a resistor and a diode. This snubber circuits 26 allows chattering noise generated during the zero-crossing detection of the zero-crossing comparator 24 to be removed, and alternating current power with less noise superposition to be supplied to the load.

The phase lead compensation circuit 28 is connected to the rear stage of the current sensor 21 for detecting the current $i_{L1}$ flowing through the transmitter coil 11. Phase difference between the gate signal for the transistors (FETI and FETII in FIG. 5) included in the switching circuit 27 and it is desired to be zero. In an actual circuit, however, there is always a delay. The phase lead compensation circuit 28 is a circuit for compensating this delay, and thereby allowing the phase difference between the gated signal and $i_{L1}$ to reach zero. Although the phase lead compensation circuit 28 is configured with a circuit including a resistor and a capacitor in the present embodiment, but it is not limited to this configuration.

The direct current offset adjustment circuit 29 is connected between the phase lead compensation circuit 28 and the zero-crossing comparator 24. This direct current offset adjustment circuit 29 is in charge of adjusting the direct current offset voltage of the current waveform of the transmitter coil 11 detected by the current sensor 21. If a duty ratio of the gate signal for the transistors (FETI and FETII in FIG. 5) included in the switching circuit 27 deviates from 50%, the transmission power may decrease. The duty ratio therefore is desired to be 1:1 (50%). The direct current offset adjustment circuit 29 allows the duty ratio to be adjusted toward 50% (the gate signal whose duty ratio is adjusted toward 50% in an experiment is presented in FIG. 15 (a) below).

Among the components of the negative resistance circuit 20, the current sensor 21, the zero-crossing comparator 24, the gate signal generation circuit 25, the snubber circuits 26, the switching circuit 27, the phase lead compensation circuit 28 and the direct current offset adjustment circuit 29 function as a current waveform feedback type half-bridge inverter, and constitute a main circuit of the negative resistance circuit. The wireless power transfer circuit illustrated in FIG. 5 therefore has PT symmetry, and thus the magnetic resonance wireless power transfer device of the present embodiment falls under PT symmetric wireless power transfer device described above. As a result, in the magnetic resonance wireless power transfer device of the present embodiment, frequency at which the transmission power may be maintained constant is automatically selected even when transmission distance (distance from the transmitter coil 11 to the receiver coil 31) changes. This eliminates need for a computer for frequency tracking control.

In addition, in the magnetic resonance wireless power transfer device of the present embodiment, as illustrated in FIG. 2 discussed above, out of two resonant loops, namely Loop I and Loop II, in which a resonant current is circulatable when the transmitter resonant circuit 10 and the receiver resonant circuit 30 are regarded as a double resonant circuit coupled each other, Q value of the Loop II is set to be higher than Q value of the Loop I. This allows the device to continuously operate in Mode II even when the transmission distance changes. The magnetic resonance wireless power transfer device of the present embodiment therefore may be suitably used even in applications with long transmission distances.

In the magnetic resonance wireless power transfer device of the present embodiment, the following innovations may contribute as factors that cause the Q value of the Loop II to be higher than that of the Loop I (factors that cause Mode II to be selected instead of Mode I).

In the magnetic resonance wireless power transfer device of the present embodiment, as illustrated in FIG. 9 (a) below, each of the transmitter coil 11 and the receiver coil 31 is wound on a magnetic core 11a, 31a. This allows an equivalent core loss resistance $r_c$ (see FIG. 2) described below to be a finite value, so that the Q value of the Loop II become higher than that of the Loop I, making Mode II more likely to be selected.

In the magnetic resonance wireless power transfer device of the present embodiment, as illustrated in FIG. 5, a capacitor (the capacitor denoted by electrostatic capacitance $C_2$ in FIG. 5) is connected in parallel with the receiver coil 31. The receiver coil 31 is configured with two windings cumulatively connected in parallel (this configuration is hereinafter sometimes referred to as "two parallel windings"). This allows the winding resistance of the receiver coil 31 to be lower compared to when employing a single wound coil (one parallel winding), making Mode II more likely to be selected. In addition, the two parallel windings have smaller self-inductance compared to that of one parallel winding, allowing PT symmetry more likely to be preserved over long transmission distances (the principle of this is explained in "Theoretical Analysis of PT symmetric Wireless Power Transfer" in "DETAILED DESCRIPTION"). Although two parallel windings are employed in the present embodiment, the receiver coil 31 may be configured with two or more windings. For example, similar effect may be observed when the receiver coil 31 is configured with three windings cumulatively connected in parallel, namely three parallel windings.

Similar effect (the effect similar to that obtained with two parallel windings) may also be obtained by configuring the receiver coil 31 with a bundle of wires (a wire rod having a plurality of wires (single wires) bundled together). If conventional Litz wire (a twisted wire rod with each wire bare) is employed as the bundle of wires, however, the occupancy ratio is likely to be poor, and good results are less likely to be obtained. When the receiver coil 31 is configured with a bundle of wires, therefore, the bundle of wires may be one in which each of the wires (single wires) has an insulating coating. For example, a triple insulated wire (reinforced insulation wire) "Litz Type TEX-ELZ" manufactured by Furukawa Electric Co., Ltd. may be employed. The bundle of wires of the receiver coil 31, however, is not necessarily needed to be twisted wires.

2. Theoretical Analysis of the Magnetic Resonance Wireless Power Transfer Device Next, A theoretical analysis of the magnetic resonance wireless power transfer device is presented. The magnetic resonance wireless power transfer device of the present disclosure falls under PT symmetric wireless power transfer device described above. FIG. 6 illustrates a model based on coupled mode theory (CMT) for a PT symmetric wireless power transfer device.

In FIG. 6, energy modes $a_n = A_n e^{j(\omega t + \theta n)}$ are expressed as wave functions of the resonant circuits. n=1 represents the transmitter resonant circuit and n=2 represents the receiver resonant circuit. $|a_n|^2$ corresponds to the magnitude of energy stored in each resonant circuit. Angular frequency ω denotes oscillation frequency when the two resonant circuits are coupled. The angular frequency ω depends on the strength of the interaction between the two resonant circuits. θn is the phase of $a_n$, and $\theta_1 - \theta_2$ corresponds to the phase difference between $a_1$ and $a_2$. Note that the amplitude of $a_n$, namely $A_n$, should be treated as a function of time because it grows gradually in the transient region of oscillation to reach a steady state. A gain rate $g_{10}$ and a load loss rate $\Gamma_L$ are supplied by the negative resistance and load resistance, respectively. $\Gamma_{10}$ and $\Gamma_{20}$ denote intrinsic loss rates of the transmitter resonant circuit and the receiver resonant circuit, respectively. K denotes a coupling rate of couplers. All of these rates $g_{10}$, $\Gamma_L$, $\Gamma_{10}$, $\Gamma_{20}$ and κ have unit of $s^{-1}$. When a condition in which the gain rate and the sum of all of the loss rates are balanced ($g_{10} = \Gamma_{10} + \Gamma_{20} + \Gamma_L$) and a condition in which the two resonant circuits are strongly coupled (κ> $\Gamma_{20} + \Gamma_L$) are both satisfied, PT symmetry is preserved and the transmission power becomes independent of the transmission distance. These two conditions cannot be satisfied when the drive frequency is fixed as in conventional magnetic resonance wireless power transfer devices. In PT symmetric wireless power transfer devices, therefore, the negative resistance circuit, whose oscillation frequency is unfixed, is needed to be employed as a power supply circuit.

J. Zhou et al. studied a SS topology of a PT symmetric wireless power transfer device (Non-Patent Literature 2). They demonstrated that transmission power and transmission efficiency were distance-independent through theoretical analysis and experimental results. For SP topology, however, this kind of theoretical analysis has not been presented. Since one or more embodiments of the magnetic resonance wireless power transfer device employ SP topology (see FIG. 5), we present a theoretical analysis of SP topology and demonstrate that the transmission power is independent of the transmission distance. We also theoretically explain how PT symmetry is preserved over a long transmission distance at low frequency.

FIG. 7 illustrates SP topology of a PT symmetric wireless power transfer device. A, input voltage $u_{in}$ with pulse waveform is expressed as a signum function of a current iL1 flowing through the transmitter coil by the following Formula 2.1. $V_{DC}$ is direct current supply voltage of the negative resistance circuit 20. Since the transmitter resonant circuit 10 is configured with a capacitor and the coil connected in series, it may be regarded as a circuit comprising a resistor, a coil, and a capacitor connected in series (RLC series circuit). In the RLC series circuit, when a pulse waveform voltage is input, a sinusoidal current flow. Waveforms of $i_{L1}$ and $u_{in}$ are therefore as presented in FIG. 8.

[Mathematical Expression 6]

$$u_{in} = \frac{\text{sgn}(i_{L1}) + 1}{2} V_{DC} \quad (2.1)$$

Relationship between the transmitter and receiver coil currents $i_{L1}$, $i_{L2}$ and the transmitter and receiver coil voltages $u_{L1}$, $u_{L2}$ is expressed by the following Formula 2.2, considering mutual inductance M.

[Mathematical Expression 7]

$$\frac{d}{dt}\begin{bmatrix} i_{L1} \\ i_{L2} \end{bmatrix} = \begin{bmatrix} L_1 & M \\ M & L_2 \end{bmatrix}^{-1} \begin{bmatrix} u_{L1} \\ u_{L2} \end{bmatrix} \quad (2.2)$$

$u_{L1}$, $u_{L2}$ and the transmitter and receiver capacitor voltages $u_{C1}$, $u_{C2}$ may be expressed by the following Formula 2.3 according to Kirchhoff's law. $r_1$ and $r_2$ denote resistance components of the transmitter coil and the receiver coil, respectively.

[Mathematical Expression 8]

$$\begin{bmatrix} u_{L1} \\ u_{L2} \end{bmatrix} = \begin{bmatrix} -r_1 & 0 \\ 0 & -r_2 \end{bmatrix}\begin{bmatrix} i_{L1} \\ i_{L2} \end{bmatrix} + \begin{bmatrix} u_{in} - u_{C1} \\ -u_{C2} \end{bmatrix} \quad (2.3)$$

Relationship between $u_{C1}$, $u_{C2}$, and $i_{L1}$ and receiver capacitor current $i_{C2}$ is expressed as in the following Formula 2.4. Note that in the following Formula 2.4, $-i_{C2}$ is expressed as ($i_{L2} - u_{C2}/R_L$), which is derived according to Kirchhoff's law.

[Mathematical Expression 9]

$$\frac{d}{dt}\begin{bmatrix} u_{C1} \\ u_{C2} \end{bmatrix} = \begin{bmatrix} 1/C_1 \\ 1/C_2 \end{bmatrix}\begin{bmatrix} i_{L1} \\ i_{L2} - u_{C2}/R_L \end{bmatrix} \quad (2.4)$$

From Formulas 2.1 through 2.4 above, a state equation of the following Formula 2.5 is obtained. Here, $\zeta = L_1 L_2 - M^2$.

[Mathematical Expression 10]

$$\frac{d}{dt}\begin{bmatrix} i_{L1} \\ u_{C2} \\ i_{L2} \\ u_{C2} \end{bmatrix} = \quad (2.5)$$

$$\begin{bmatrix} -L_2 r_1/\zeta & -L_2/\zeta & Mr_2/\zeta & M/\zeta \\ 1/C_1 & 0 & 0 & 0 \\ Mr_1/\zeta & M/\zeta & -L_1 r_2/\zeta & -L_1/\zeta \\ 0 & 0 & 1/C_2 & -1/(C_2 R_L) \end{bmatrix}\begin{bmatrix} i_{L1} \\ u_{C1} \\ i_{L2} \\ u_{C2} \end{bmatrix} +$$

$$\begin{bmatrix} L_2/\zeta \\ 0 \\ -M/\zeta \\ 0 \end{bmatrix} \frac{\text{sgn}(i_{L1}) + 1}{2} V_{oc}$$

The following Table 1 presents correspondence between CMT parameters in FIG. 6 and circuit parameters in FIG. 7. In the following Table 1, $k_m$ denotes a magnetic coupling coefficient. $\omega_1$ and $\omega_2$ denote intrinsic resonance angular frequencies of the transmitter circuit and receiver resonant circuit, respectively, when there is no interaction between the two resonant circuits.

TABLE 1

| Transmitter Energy mode | $a_1$ | $\sqrt{\frac{L_1}{2}} i_{L1} + j\sqrt{\frac{C_1}{2}} u_{C1}$ |
|---|---|---|
| Receiver Energy mode | $a_2$ | $\sqrt{\frac{L_2}{2}} i_{L2} + j\sqrt{\frac{C_2}{2}} u_{C2}$ |
| Transmitter Intrinsic Angular frequency | $\omega_1$ | $1/\sqrt{L_1 C_1}$ |
| Receiver Intrinsic Angular frequency | $\omega_2$ | $1/\sqrt{L_2 C_2}$ |
| Gain rate | $g_{10}$ | $\dfrac{V_{DC}}{\pi\sqrt{L_1^2 i_{L1}^2 + L_1 C_1 u_{C1}^2}}$ |
| Transmitter Intrinsic loss rate | $\Gamma_{10}$ | $r_1/(2L_1)$ |
| Receiver Intrinsic loss rate | $\Gamma_{20}$ | $r_2/(2L_2)$ |
| Load loss rate | $\Gamma_L$ | $1/(2C_2 R_L)$ |
| Coupling rate | $\kappa$ | $k_m \omega_0/2$ ($\omega_0 \equiv \omega_1 = \omega_2$) |

Considering that the electrical energy stored in the transmitter resonant circuit and the receiver resonant circuit circulates between the coil and the capacitor, wave functions of the coil current $i_{L1}$ and the capacitor voltage $u_{Cn}$ may be expressed by the following Formulas 2.6a and 2.6b using $A_n$.

[Mathematical Expression 11]

$$i_{Ln} = \sqrt{\frac{2}{L_b}} A_n \cos(\omega t + \theta_n) \quad (2.6a)$$

[Mathematical Expression 12]

$$u_{Cn} = \sqrt{\frac{2}{C_b}} A_n \sin(\omega t + \theta_n) \quad (2.6b)$$

Since $A_n$ should be treated as a function of time in the time region from the start of oscillation to the steady state (transient region), the derivative of $a_n$ may be expressed by the following Formula 2.7.

[Mathematical Expression 13]

$$\frac{da_n}{dt} = \frac{dA_n}{dt} e^{j(\omega t + \theta_n)} + jA_n\left(\omega + \frac{d\theta_n}{dt}\right) e^{j(\omega t + \theta_n)} \quad (2.7)$$

$dA_n/dt$ and $A_n(\omega + d\theta_n/dt)$ may be expressed by the following Formulas 2.8a through 2.8d by substituting Formulas 2.6a and 2.6b above into Formula 2.5 above.

[Mathematical Expression 14]

$$\frac{dA_1}{dt} = -\frac{1}{2}\frac{L_2 r_1}{L_1 L_2 - M^2} A_1 + \frac{1}{2}\frac{Mr_2}{L_1 L_2 - M^2}\sqrt{\frac{L_1}{L_2}} A_2 \cos(\theta_1 - \theta_2) - \quad (2.8a)$$

$$\frac{1}{2}\frac{M}{L_1 L_2 - M^2}\sqrt{\frac{L_1}{C_2}} A_2 \sin(\theta_1 - \theta_2) +$$

-continued $$\frac{L_2}{L_1L_2 - M^2}\sqrt{\frac{L_1}{2}}\cos(\omega t + \theta_1)\frac{\text{sgn}[\cos(\omega t + \theta_1)] + 1}{2}V_{DC}$$

[Mathematical Expression 15]

$$A_1\left(\omega + \frac{d\theta_1}{dt}\right) = \frac{1}{2}\frac{1}{\sqrt{C_1 L_1}}A_1 + \qquad (2.8b)$$

$$\frac{1}{2}\frac{L_2}{L_1L_2 - M^2}\sqrt{\frac{L_1}{C_1}}A_1 - \frac{1}{2}\frac{Mr_2}{L_1L_2 - M^2}\sqrt{\frac{L_1}{L_2}}A_2\sin(\theta_1 - \theta_2) -$$

$$\frac{1}{2}\frac{M}{L_1L_2 - M^2}\sqrt{\frac{L_1}{C_2}}A_2\cos(\theta_1 - \theta_2) -$$

$$\frac{L_2}{L_1L_2 - M^2}\sqrt{\frac{L_1}{2}}\sin(\omega t + \theta_1)\frac{\text{sgn}[\cos(\omega t + \theta_1)] + 1}{2}V_{DC}$$

[Mathematical Expression 16]

$$\frac{dA_2}{dt} = -\frac{1}{2}\frac{1}{C_2 R_l}A_2 + \frac{1}{2}\frac{Mr_1}{L_1L_2 - M^2}\sqrt{\frac{L_2}{L_1}}A_1\cos(\theta_1 - \theta_2) + \qquad (2.8c)$$

$$\frac{1}{2}\frac{M}{L_1L_2 - M^2}\sqrt{\frac{L_2}{C_1}}A_1\sin(\theta_1 - \theta_2) - \frac{1}{2}\frac{L_1 r_2}{L_1L_2 - M^2}A_2 -$$

$$\frac{M}{L_1L_2 - M^2}\sqrt{\frac{L_2}{2}}\cos(\omega t + \theta_2)\frac{\text{sgn}[\cos(\omega t + \theta_1)] + 1}{2}V_{DC}$$

[Mathematical Expression 17]

$$A_2\left(\omega + \frac{d\theta_2}{dt}\right) = \frac{1}{2}\frac{1}{\sqrt{C_2 L_2}}A_2 + \qquad (2.8d)$$

$$\frac{1}{2}\frac{L_1}{L_1L_2 - M^2}\sqrt{\frac{L_2}{C_2}}A_2 + \frac{1}{2}\frac{Mr_1}{L_1L_2 - M^2}\sqrt{\frac{L_2}{L_1}}A_1\sin(\theta_1 - \theta_2) -$$

$$\frac{1}{2}\frac{M}{L_1L_2 - M^2}\sqrt{\frac{L_2}{C_1}}A_1\cos(\theta_1 - \theta_2) +$$

$$\frac{M}{L_1L_2 - M^2}\sqrt{\frac{L_2}{2}}\sin(\omega t + \theta_2)\frac{\text{sgn}[\cos(\omega t + \theta_1)] + 1}{2}V_{DC}$$

The time scale of changes in $A_n$ is sufficiently longer than the oscillation frequency period $\tau = 2\pi/\omega$. This is also indicated from the fact that the time constant $2L_1/r_1$ of $A_n$ to the step response is sufficiently longer than T. This suggests that the alternating current component of the last terms in the Formulas 2.8a through 2.8d above may be ignored because their effects on $A_n$ are small. By ignoring the alternating current component of the product of the signum function and the cosine function, therefore, approximations as in the following Formulas 2.9a through 2.9d may be made.

[Mathematical Expression 18]

$$\cos(\omega t + \theta_1)\frac{\text{sgn}[\cos((\omega t + \theta_1)] + 1}{2} \approx \frac{1}{\pi} \qquad (2.9a)$$

[Mathematical Expression 19]

$$\sin(\omega t + \theta_1)\frac{\text{sgn}[\cos((\omega t + \theta_1)] + 1}{2} \approx 0 \qquad (2.9b)$$

[Mathematical Expression 20]

$$\cos(\omega t + \theta_2)\frac{\text{sgn}[\cos((\omega t + \theta_1)] + 1}{2} \approx \frac{\cos(\theta_2 - \theta_1)}{\pi} \qquad (2.9c)$$

[Mathematical Expression 21]

$$\sin(\omega t + \theta_2)\frac{\text{sgn}[\cos((\omega t + \theta_1)] + 1}{2} \approx \frac{\sin(\theta_2 - \theta_1)}{\pi} \qquad (2.9d)$$

The Formulas 2.8a through 2.8d above may be rewritten into the following Formulas 2.10a through 2.10d according to the corresponding relationships in Table 1 above. Here, $V_{DC}/(\pi(2L_1)^{1/2})$ and phase difference $\theta_1-\theta_2$ are denoted as $G_0$ and $\varphi$, respectively. $L_1$ and $L_2$ are removed from these formulas using $k_m = M/(L_1 L_2)$.

[Mathematical Expression 22]

$$\frac{dA_1}{dt} = -\frac{1}{1-k_m^2}\Gamma_{10}A_1 + \qquad (2.10a)$$

$$\frac{k_m}{1-k_m^2}\Gamma_{20}A_2\cos\varphi - \frac{1}{2}\frac{k_m}{1-k_m^2}\omega_2 A_2\sin\varphi + \frac{1}{1-k_m^2}G_0$$

[Mathematical Expression 23]

$$A_1\left(\omega + \frac{d\theta_1}{dt}\right) = \qquad (2.10b)$$

$$\frac{1}{2}\frac{1}{1-k_m^2}\omega_1 A_1 + \frac{1}{2}\omega_1 A_1 - \frac{k_m}{1-k_m^2}\Gamma_{20}A_2\sin\varphi - \frac{1}{2}\frac{k_m}{1-k_m^2}\omega_2 A_2\cos\varphi$$

[Mathematical Expression 24]

$$\frac{dA_2}{dt} = -\Gamma_L A_2 + \frac{k_m}{1-k_m^2}\Gamma_{10}A_1\cos\varphi + \qquad (2.10c)$$

$$\frac{1}{2}\frac{k_m}{1-k_m^2}\omega_1 A_1\sin\varphi - \frac{1}{1-k_m^2}\Gamma_{20}A_2 - \frac{k_m}{1-k_m^2}G_0\cos\varphi$$

[Mathematical Expression 25]

$$A_2\left(\omega + \frac{d\theta_2}{dt}\right) = \frac{1}{2}\omega_2 A_2 + \frac{k_m}{1-k_m^2}\Gamma_{10}A_1\sin\varphi - \qquad (2.10d)$$

$$\frac{1}{2}\frac{k_m}{1-k_m^2}\omega_1 A_1\cos\varphi + \frac{1}{2}\frac{1}{1-k_m^2}\omega_2 A_2 - \frac{k_m}{1-k_m^2}G_0\sin\varphi$$

The derivatives of $a_n$ may be expressed in the following Formulas 2.11a and 2.11b by substituting Formulas 2.10a through 2.10d into Formula 2.7 above. Here, $1-k_m^2$ is approximated to 1. Furthermore, the intrinsic resonance angular frequencies of the two resonant circuits are unified by $\omega_0$ because $\omega_1 = \omega_2$ is a necessary condition for preserving PT symmetry.

[Mathematical Expression 26]

$$\frac{da_1}{dt} = \left(j\omega_0 - \Gamma_{10} + \frac{G_0}{|a_1|}\right)A_1 e^{j(\omega t + \theta_1)} + \qquad (2.11a)$$

$$\{k_m \Gamma_{20}(\cos\varphi - j\sin\varphi) - \kappa(\sin\varphi + j\cos\varphi)\}A_2 e^{j(\omega t + \theta_1)}$$

[Mathematical Expression 27]

$$\frac{da_2}{dt} = (j\omega_0 - \Gamma_L - \Gamma_{20})A_2 e^{j(\omega t + \theta_2)} + \qquad (2.11b)$$

$$\left\{k_m \Gamma_{10}(\cos\varphi + j\sin\varphi) - k_m \frac{G_0}{|a_1|}(\cos\varphi + j\sin\varphi) + \right.$$

$$\left. \kappa(\sin\varphi - j\cos\varphi)\right\}A_1 e^{j(\omega t + \theta_2)}$$

$k_m$ is a dimensionless parameter and is different in dimension from other CMT parameters ($\omega_0$, $G_0$, $\Gamma_{10}$, $\Gamma_{20}$, $\Gamma_L$, $\kappa$) which have a dimension of $s^{-1}$. Furthermore, the value of $k_m$ is equal to $2\kappa/\omega_0$, which is much smaller than the other parameters. Terms containing $k_m$ therefore are ignored because they have little effect on the derivative value of $a_n$. Through this process, the Formula 2.5 above, which is the state equation of SP topology, may be converted to the coupled-mode model of the following Formula 2.12, which is a mathematical expression in CMT.

[Mathematical Expression 28]

$$\frac{d}{dt}\begin{bmatrix} a_1 \\ a_2 \end{bmatrix} = \begin{bmatrix} j\omega_0 + \left(\frac{G_0}{|a_j|} - \Gamma_{10}\right) & -j\kappa \\ -j\kappa & j\omega_0 - (\Gamma_{20} + \Gamma_L) \end{bmatrix}\begin{bmatrix} a_1 \\ a_2 \end{bmatrix} \quad (2.12)$$

Next, a state in which sufficient time has passed since the start of oscillation (steady state) is considered. In the steady state, $A_n$ is saturated, and the relationship between the gain rate and the loss rate always satisfies a formula $G_0/|a_1| - \Gamma_{10} = \Gamma_{20} + \Gamma_L$. Here, $G_0/|a_1|$ corresponds to the gain rate $g_{10}$ (Table 1). By substituting Formula 2.12 above into $G_0/|a_1| - \Gamma_{10} = \Gamma_{20} + \Gamma_L$, the relational formula in the following Formula 2.13 is obtained.

[Mathematical Expression 29]

$$|a_1| = |a_2| \quad (2.13)$$

A characteristic equation of Formula 2.12 above is expressed by the following Formula 2.14.

[Mathematical Expression 30]

$$\begin{vmatrix} j(\omega - \omega_0) - \left(\frac{G_0}{|a_1|} - \Gamma_{10}\right) & j\kappa \\ j\kappa & j(\omega - \omega_0) + (\Gamma_{20} + \Gamma_L) \end{vmatrix} = 0 \quad (2.14)$$

According to a condition where the imaginary part of Formula 2.14 above is zero, oscillation angular frequencies of two oscillation modes (Mode I and Mode II) expressed by the following Formulas 2.15a and 2.15b may be identified. $\omega_I$ expressed by the following Formula 2.15a is a more accurate expression of the angular frequency corresponding to the resonance frequency $f_I$ (Formula 1.2 above) in the Loop I (Mode I) described above, whereas $w_{II}$ expressed by the following Formula 2.15b is a more accurate expression of the angular frequency corresponding to the resonance frequency $f_{II}$ (Formula 1.3 above) in the Loop II (Mode II) described above.

[Mathematical Expression 31]

$$\omega_l = \omega_0 - \sqrt{\kappa^2 - (\Gamma_{20} + \Gamma_L)^2} \quad (\kappa > \Gamma_{20} + \Gamma_L) \quad (2.15a)$$

[Mathematical Expression 32]

$$\omega_h = \omega_0 + \sqrt{\kappa^2 - (\Gamma_{20} + \Gamma_L)^2} \quad (\kappa > \Gamma_{20} + \Gamma_L) \quad (2.15b)$$

From the relationship in Formula 2.13 above and a condition where the real part of Formula 2.14 above is zero, the energy stored in the receiver resonant circuit may be derived as in the following Formula 2.16.

[Mathematical Expression 33]

$$|a_2|^2 = \frac{G_0^2}{(\Gamma_{10} + \Gamma_{20} + \Gamma_L)^2}(\kappa > \Gamma_{20} + \Gamma_L) \quad (2.16)$$

Using Formula 2.6b and Formula 2.16 above, transmission power $P_L$ is derived by the following Formula 2.17.

[Mathematical Expression 34]

$$P_L = \frac{1}{\tau}\int_0^\tau \frac{u_{C2}^2}{R_L}dt = \frac{1}{\tau}\int_0^\tau \left\{\frac{2}{R_L C_2}A_2^2\sin^2(\omega t + \theta_2)\right\}dt \quad (2.17)$$

$$= \frac{A_2^2}{R_L C_2}\frac{1}{\tau}\int_0^\tau dt - \frac{1}{R_L C_2}\int_0^\tau \cos(2\omega t + 2\theta_2)dt$$

$$= \frac{1}{R_L C_2}|a_2|^2 = 2\Gamma_L \frac{G_0^2}{(\Gamma_{10} + \Gamma_{20} + \Gamma_L)^2}(\kappa > \Gamma_{20} + \Gamma_L)$$

By a similar process, intrinsic power losses (which refers to the power consumed outside of the load resistance) of the transmitter resonant circuit and the receiver resonant circuit may be derived as $2\Gamma_{10}|a_1|^2$ and $2\Gamma_{20}|a_2|^2$, respectively. Transmission efficiency $\eta$ therefore may be expressed by the following Formula 2.18 using the relationship in Formula 2.13 above.

[Mathematical Expression 35]

$$\eta = \frac{2\Gamma_L|a_2|^2}{2\Gamma_{10}|a_1|^2 + 2\Gamma_{20}|a_2|^2 + 2\Gamma_L|a_2|^2} = \frac{\Gamma_L}{\Gamma_{10} + \Gamma_{20} + \Gamma_L}(\kappa > \Gamma_{20} + \Gamma_L) \quad (2.18)$$

From Formula 2.17 and Formula 2.18 above, it may be seen that the transmission power and the transmission efficiency are independent of the coupling rate $\kappa$. $\kappa$ is proportional to $k_m$ (see Table 1), and the value of said $k_m$ is determined by the transmission distance (see FIG. 11 below). The fact that Formula 2.17 and Formula 2.18 above are independent of $\kappa$, therefore, means that they are also independent of the transmission distance. In short, it may be seen that, in SP topology, under conditions where PT symmetry is preserved, the transmission power and the transmission efficiency are theoretically constant independent of the transmission distance. While $k_m$ also decreases in the case of misalignment between the transmitter coil and the receiver coil, the transmission power and the transmission efficiency theoretically remain constant in this case as well. A wireless power transfer device with robustness against misalignment is thus expected to be realized.

Under conditions where PT symmetry is not preserved ($\kappa < \Gamma_{20} + \Gamma_L$), the oscillation angular frequency $\omega$ coincides with $\omega 0$. In this case, the transmission power and the transmission efficiency strongly depend on the coupling rate $\kappa$, as expressed in the following Formulas 2.19 and 2.20. The transmission power and the transmission efficiency therefore significantly vary with respect to changes in the transmission distance.

[Mathematical Expression 36]

$$P_L = 2\Gamma_L\left\{\frac{\kappa G_0}{\kappa^2 + \Gamma_{10}(\Gamma_{20} + \Gamma_L)}\right\}^2 \quad (\kappa < \Gamma_{20} + \Gamma_L) \quad (2.19)$$

-continued

[Mathematical Expression 37]

$$\eta = \frac{\Gamma_L}{(\Gamma_{20} + \Gamma_L)\left\{1 + \frac{\Gamma_{10}}{\kappa^2}(\Gamma_{20} + \Gamma_L)\right\}} \quad (\kappa < \Gamma_{20} + \Gamma_L) \quad (2.20)$$

From condition where PT symmetry is preserved ($\kappa > \Gamma_{20} + \Gamma_L$) and condition where PT symmetry is not preserved ($\kappa < \Gamma_{20} + \Gamma_L$), a critical coupling rate $\kappa_C$, which is a boundary between preservation and non-preservation, may be expressed as $\kappa_C = \Gamma_{20} + \Gamma_L$. This critical coupling rate $\kappa_C$ may be converted to a critical magnetic coupling coefficient $k_{mC}$ as expressed in the following Formula 2.21. Here, $Q_2$ denotes Q value of the receiver coil. Since $k_{mC}$ may be converted to the transmission distance, the following Formula 2.21 may be used to determine a limit transmission distance (critical transmission distance) at which PT symmetry is preserved.

[Mathematical Expression 38]

$$k_{mC} = \frac{1}{Q_2} + \frac{1}{\omega_0 C_2 R_L} \quad (2.21)$$

In actual magnetic resonance wireless power transfer devices, the second term in Formula 2.21 above has a larger value than that of the first term. By setting $\omega_0 C_2 R_L$ as large as possible, therefore, PT symmetry become likely to be preserved over longer transmission distances. There is an optimum value, however, for the load resistance $R_L$ that maximizes the transmission efficiency as indicated by the following Formula 2.22. If the value of $R_L$ is increased beyond this optimum value without limit, therefore, a problem will arise in which the transmission efficiency will be significantly reduced.

[Mathematical Expression 39]

$$R_L = \frac{r_2 Q_2}{k_m} \sqrt{\frac{Q_2}{Q_1}} \quad (2.22)$$

By setting $\omega_0 C_2$ as large as possible, therefore, PT symmetry become likely to be preserved over longer transmission distances. $\omega_0$ and $C_2$, however, have a trade-off relationship, i.e., increasing either one will decrease the other. Thus, adjusting only the values of $\omega_0$ and $C_2$ may not result in an increase of $\omega_0 C_2$.

$\omega_0 C_2$ can be converted to $(C_2/L_2)^{1/2}$. This leads to a conclusion that by reducing self-inductance $L_2$ of the receiver coil, $\omega_0 C_2$ may be increased and PT symmetry may be preserved over long transmission distances even at low frequencies.

3. Experiments

The following experiments and calculations have been performed to evaluate effectiveness of the magnetic resonance wireless power transfer device of the present disclosure.

3.1 Transmitter Coil and Receiver Coil

Verification was made on which type of coil would be suitable for the transmitter coil and the receiver coil among applicable coils. FIG. 9 is schematic diagrams and photographs of the transmitter coil 11 and the receiver coil 31 used in the experiment, in which FIG. 9 (a) illustrates solenoid coils and FIG. 9 (b) illustrates spiral coils. In the following, the transmitter coil 11 is denoted with "Tx" and the receiver coil 31 is denoted with "Rx". The specifications of the solenoid coils and the spiral coils are presented in the following Table 2. As the magnetic core (magnetic material core), a Mn—Zn ferrite with an initial permeability of $2300 \times \mu_0$ ($\mu_0$ is the permeability of a vacuum) and a saturation magnetic flux density of 0.39 T was used. As the winding wire, a stranded bundle of seven single build copper wires with a diameter of 0.18 mm or 0.30 mm (the 0.30 mm diameter one was used for the Tx solenoid coil) was used. By configuring the receiver coil with two parallel windings, the self-inductance was reduced to approximately ¼ (from 484 μH to 119 μH) compared to when a single winding was wound, whereas Q value of the coil was not significantly changed (from 253 to 242).

TABLE 2

|    |                              | Solenoid coils | Spiral coils |
|----|------------------------------|----------------|--------------|
| Tx | Weight                       | 69.2 g         | 61.9 g       |
|    | Magnet-pole area             | 585 mm²        | 576 mm²      |
|    | Cross-sectional area         | 63.7 mm²       | 576 mm²      |
|    | Self-inductance              | 227.17 μH      | 141.19 μH    |
|    | Winding resistance (at 60 kHz) | 313 mΩ       | 581 mΩ       |
| Rx | Weight                       | 45.6 g         | 61.6 g       |
|    | Magnet-pole area             | 585 mm²        | 576 mm²      |
|    | Cross-sectional area         | 63.7 mm²       | 576 mm²      |
|    | Self-inductance              | 119.11 μH      | 141.49 μH    |
|    | Winding resistance (at 60 kHz) | 148 mΩ       | 578 mΩ       |

FIG. 10 presents frequency response of the Q value of the Rx coil, obtained from experiments and calculations. The calculated results were in good agreement with the experimental results. The Q values measured at a frequency of 40 kHz were 242 for the solenoid coil and 66 for the spiral coil. FIG. 11 presents relationship between $k_m$ and $d_t$ (the transmission distance), obtained from experiments and calculations. Although the spiral coil outperforms the solenoid coil at short transmission distances of 30 mm or less, there is little difference between the two types of coils at transmission distances of 30 mm or more. It is already known that the transmission efficiency is determined by the product of $k_m$ and Q. The theoretical maximum transmission efficiency at $d_t$=40 mm and frequency of 40 kHz was 91% for the solenoid coil and 72% for the spiral coil. Other samples of solenoid coils and spiral coils were also made and tested, and similar results were obtained for these samples.

The results above indicate that solenoid coils may be better than spiral coils as the transmitter coil and the receiver coil in the magnetic resonance wireless power transfer device.

3.2 Operation and Performance of Magnetic Resonance Wireless Power Transfer Device Experiments were then made to evaluate oscillation and transmission performance (transmission efficiency, transmission power, robustness against coil misalignment, etc.) of the magnetic resonance wireless power transfer device of the embodiment described above. As for the magnetic resonance wireless power transfer device, the one illustrated in FIG. 5 above was used.

FIG. 12 presents oscilloscope observations on the current $i_{L1}$ in the transmitter coil 11 (FIG. 5) and the current $i_{L2}$ in the receiver coil 31 (FIG. 5) starting to oscillate after the moment the trigger button 23 (FIG. 5) was pressed at time t=0. The oscillator 22 (FIG. 5) was set to produce a sinusoidal wave with a frequency of 33 kHz and an amplitude of 100 mV. Note, however, that oscillation was observed in all cases where the oscillator 22 produced a sinusoidal wave with an amplitude of 100 mV or greater and a frequency of 20 to 100 kHz. These results indicate effectiveness of the trigger mechanism 13.

FIG. 13 presents experimental results of waveforms of the gate signal, as well as those of the voltage ($u_{in}$, $u_{C2}$) and the current ($i_{L1}$, $i_{RL}$), in a state in which sufficient time has passed since the trigger button 23 (FIG. 5) was pressed (steady state), measured with an oscilloscope. It was observed that the duty ratio of the gate signal may be adjusted to 1:1 (50%) by the direct current offset adjustment circuit 29 (FIG. 5). It was also observed that the chattering noise generated by the zero-crossing comparator 24 (FIG. 5) may be removed by adding the snubber circuit 26 (FIG. 5) configured with a resistor, a capacitor and a diode, to the gate signal line 20b (FIG. 5).

Addition of the phase lead compensation circuit 28 (FIG. 5) was observed to be effective in compensating for the time delay of the gate signal. When a silicon field effect transistor (Si-FET) having a low ON-resistance (2.3 mΩ) was employed as the transistors in the switching circuit 27, and the time (dead time) between ON and OFF switching of the two Si-FETs was set to 400 ns (see the photograph in FIG. 13 (a)), which was relatively long, the power efficiency in the negative resistance circuit 20 (FIG. 5) reached 97%

FIG. 14 illustrates an equivalent circuit for SP topology. The magnetic resonance wireless power transfer device of the present embodiment employs SP topology. The existence of the two oscillation modes (Mode I and Mode II) has already been explained in reference to the equivalent circuit of PP topology illustrated in FIG. 2. The difference between SP topology and PP topology is only whether the capacitor of the transmitter resonant circuit 10 is connected in series or in parallel with the transmitter coil. Accordingly, there are two oscillation modes (Mode I and Mode II) also in SP topology, just as in PP topology. In addition, the formulas for the oscillation frequencies are each identical. Furthermore, the property that oscillation occurs in a loop with higher Q value out of the two resonant loops (the Loop I and the Loop II) is the same in SP topology and PP topology.

FIG. 15 presents relationship between the transmission distance $d_t$ and the oscillation frequency. The three curves in FIG. 15 are the results of calculations based on CMT. There are two oscillation modes exist below the boundary of 40 mm, which is the theoretical critical transmission distance. In FIG. 15, the mode denoted as PTS mode corresponds to the Mode I ($\omega_I$) expressed by Formula 2.15a above, whereas the mode denoted as Anti-PTS mode corresponds to the Mode II ($\omega_{II}$) expressed by Formula 2.15b above. As PT symmetry is not preserved in the region where the transmission distance exceeds 40 mm, it is denoted as an Asymmetric mode in FIG. 15. The magnetic resonance wireless power transfer device of the present embodiment was designed to operate in anti-PTS mode (Mode II). As intended, it was confirmed from the experimental results in FIG. 15 that oscillation occurred in Mode II at all the transmission distances studied.

FIG. 16 presents variations in the transmission power $P_L$ and the transmission efficiency η versus the transmission distance $d_t$. In FIG. 16, the data points displayed as filled circles are the experimental results of the magnetic resonance wireless power transfer device of the present embodiment. The solid and dashed lines in the same figure are the results of calculations based on CMT. The data points displayed as hollow circles in the same figure are the experimental results for the case where the feedback line 20a (FIG. 5) is disconnected and the operating frequency is fixed at 35 kHz. When the feedback line 20a is disconnected and the operating frequency is fixed, PT symmetry is not preserved at any transmission distance. This means that the data points displayed as hollow circles correspond to experimental results obtained with a conventional magnetic resonance wireless power transfer device that does not have PT symmetry. The effectiveness of the device of the present disclosure may be verified by comparing the results represented by the filled circles and those represented by the hollow circles.

First, the $P_L$ value of the magnetic resonance wireless power transfer device of the present embodiment remained within 23±1 W in the region of 12 to 40 mm. Comparison with the experimental results with the conventional method represented by the hollow circle clearly indicates that preservation of PT symmetry improves robustness with respect to transmission distance. Considering that no solenoid coil with a transmission distance longer than the square root of the magnet-pole area has ever been found, the transmission distance of $d_t$=40 mm may be sufficiently long for the coil with a magnet-pole area of 585 mm². $P_L$ increases sharply above 40 mm. This is consistent with the theoretical critical transmission distance. When the Rx coil was changed from two parallel windings to three parallel windings, the self-inductance decreased from 119 µH to 53 µH and the critical transmission distance increased from 40 mm to 53 mm. On the other hand, when it was changed from two parallel windings to one parallel winding, the self-inductance increased from 119 µH to 484 µH and the critical transmission distance decreased from 40 mm to 31 mm. These results indicate that it is an effective method to employ the parallel windings (two parallel windings or three parallel windings) employed in the receiver coil 31 of the magnetic resonance wireless power transfer device of the present embodiment for extending the transmission distance over which PT symmetry is preserved.

Second, the value of n for the magnetic resonance wireless power transfer device of the present embodiment remained at 83±1% for the transmission distance of up to 40 mm. This value of η is somewhat lower than that of an air-core high-frequency coil with no core loss. Nevertheless, this value of 83% may be considered sufficiently high, considering that no report was found of coils with efficiencies of 75% or higher among coils of similar size and power. When the Rx coil winding was changed from two parallel windings to three parallel windings, the efficiency decreased from 83%±1% to 73%±1% due to a decrease in Q value (from 242 to 184). Regarding this decrease, theoretical investigation may be needed in the future. Nevertheless, these experiments demonstrate that preservation of PT symmetry improves robustness with respect to transmission distance.

For practical applications, it is useful to understand the effect of coil misalignment on the transmission power $P_L$ and the transmission efficiency η. FIG. 17 presents variations in transmission power $P_L$ and transmission efficiency η with respect to lateral misalignment in lengthwise direction (x direction). FIG. 18 presents variations in transmission power $P_L$ and transmission efficiency η with respect to lateral misalignment in widthwise direction (y direction). FIG. 19 presents variations in transmission power $P_L$ and transmission efficiency η with respect to lateral rotation. Experimental results obtained with the conventional method (where the operating frequency was fixed at 35 kHz) are provided for comparison (hollow circles). As seen in FIGS. 17-19, the magnetic resonance wireless power transfer device of the present embodiment exhibits improved robustness against misalignment compared to the conventional method in all of the graphs. For instance, the allowable range in which a constant power (23±1 W) is maintained is, ±25 mm in the x-direction, ±40 mm in the y-direction, and ±65° in the rotation angle. Among these, for the rotation angle, it may be said that preservation of PT symmetry provided a significant improvement, considering that the allowable range thereof is as small as ±5° in the conventional method.

An attempt was also made to evaluate the tracking performance of the transmission power $P_L$ and the transmission efficiency η when the transmission distance $d_t$ suddenly changed. An actuator capable of producing a fast and large displacement of the transmission distance $d_t$, however, was not available. Accordingly, a small solenoid coil (dimensions: 50 mm×23 mm×6.5 mm, mass: 39.0 g) was made. Such a small coil allows a relatively large displacement of $d_t$ to be produced. FIG. 20 (*a*) is a photograph of the experimental setup. A linear actuator was used to apply a step input to the position of the Rx coil. Changes in the position of the Rx coil were measured using a laser displacement sensor. FIG. 20 (*b*) is a graph presenting changes in $d_t$ versus time when a step input of 7 mm displacement is applied to $d_t$. FIG. 20 (*c*) presents the measurement results of $P_L$ and η before and after t=0, which is the time when the step was applied. Little changes were observed in $P_L$ and η between before and after the application of the step. This indicates that the magnetic resonance wireless power transfer device of the present embodiment has a fast response speed which allows it to follow rapid changes in $d_t$.

REFERENCE SIGNS LIST 10 transmitter resonant circuit
11 transmitter coil
11*a* magnetic core (magnetic material core)
20 negative resistance circuit
20*a* feedback line
20*b* gate signal line
21 current sensor
22 oscillator (alternating current power supply)
23 trigger mechanism
24 zero-crossing comparator
25 gate signal generation circuit
26 snubber circuit
27 switching circuit
28 phase lead compensation circuit
29 direct current offset adjustment circuit
30 receiver resonant circuit
31 receiver coil
31*a* magnetic core (magnetic material core)
40 load resistance

The invention claimed is:

1. A magnetic resonance wireless power transfer device, wherein
    a negative resistance circuit,
    a transmitter resonant circuit having a transmitter coil, and
    a receiver resonant circuit having a receiver coil are configured so that a parity-time symmetry is preserved, and wherein
    out of two resonant loops (hereinafter referred to as "Loop I" and "Loop II") in which a resonant current is circulatable when the transmitter resonant circuit and the receiver resonant circuit are regarded as a double resonant circuit coupled with a mutual inductance, Q value of the Loop II is set to be higher than Q value of the Loop I, so that oscillation occurs in a loop in which a leakage inductance component of the coil and a capacitance component of a capacitor resonate.

2. The magnetic resonance wireless power transfer device according to claim 1, wherein a driving frequency is 100 kHz or lower.

3. The magnetic resonance wireless power transfer device according to claim 1, wherein the transmitter coil and the receiver coil are each wound on a magnetic core.

4. The magnetic resonance wireless power transfer device according to claim 1, wherein
    a capacitor is connected in parallel with the receiver coil, and
    the receiver coil is configured with a plurality of windings cumulatively connected in parallel with each other, or a bundle of wires.

5. The magnetic resonance wireless power transfer device according to claim 1, wherein the negative resistance circuit is provided with a trigger mechanism for activation.

6. The magnetic resonance wireless power transfer device according to claim 1, wherein
    the negative resistance circuit comprises
    a current sensor,
    a zero-crossing comparator for receiving a current waveform signal of the transmitter coil detected by the current sensor,
    a gate signal generation circuit for generating a gate signal for transistors based on an output voltage of the zero-crossing comparator, and
    a switching circuit configured with a plurality of transistors for driving the transmitter coil with an alternating current in response to the gate signal output by the gate signal generation circuit.

7. The magnetic resonance wireless power transfer device according to claim 6, wherein the negative resistance circuit further comprises a phase lead compensation circuit for lead compensation of delay of said gate signal.

8. The magnetic resonance wireless power transfer device according to claim 6, wherein the negative resistance circuit further comprises a direct current offset adjustment circuit for adjusting a duty ratio of said gate signal.

* * * * *

UNITED STATES PATENT AND TRADEMARK OFFICE
CERTIFICATE OF CORRECTION

PATENT NO. : 12,230,976 B2  
APPLICATION NO. : 18/263581  
DATED : February 18, 2025  
INVENTOR(S) : Hiroki Ishida Page 1 of 1

It is certified that error appears in the above-identified patent and that said Letters Patent is hereby corrected as shown below:

In the Specification

Column 10, Line 32, delete "it is desired to be zero." and insert --$i_{L1}$ is desired to be zero.--.

Signed and Sealed this  
Seventeenth Day of June, 2025

Coke Morgan Stewart  
*Acting Director of the United States Patent and Trademark Office*